US008281614B2

(12) United States Patent
Koo et al.

(10) Patent No.: US 8,281,614 B2
(45) Date of Patent: Oct. 9, 2012

(54) WATER-COOLED AIR CONDITIONER

(75) Inventors: Ja Hyung Koo, Changwon-si (KR); In Woong Park, Changwon-si (KR); Seung Cheol Baek, Changwon-si (KR); Soo Yeon Shin, Gimhae-si (KR); Dong Hyuk Lee, Changwon-si (KR)

(73) Assignee: LG Electronics Inc., Seoul (KR)

( * ) Notice: Subject to any disclaimer, the term of this patent is extended or adjusted under 35 U.S.C. 154(b) by 277 days.

(21) Appl. No.: 11/812,377

(22) Filed: Jun. 18, 2007

(65) Prior Publication Data
US 2008/0087027 A1    Apr. 17, 2008

(30) Foreign Application Priority Data

Oct. 17, 2006  (KR) .................. 10-2006-0100610

(51) Int. Cl.
*F25B 39/04* (2006.01)
*F25B 41/00* (2006.01)
(52) U.S. Cl. ............. 62/506; 62/81; 62/183; 62/324.1
(58) Field of Classification Search ............. 62/80, 81, 62/324.1, 468, 470, 506, 510, 196.4, 197, 62/150, 177, 181, 183; 165/71; 126/570, 126/588, 598, 632
See application file for complete search history.

(56) References Cited

U.S. PATENT DOCUMENTS

| 3,431,750 A | 3/1969 | Lefranc |
| 3,945,432 A | 3/1976 | Tamblyn |
| 4,373,346 A | 2/1983 | Hebert et al. |
| 4,538,418 A | 9/1985 | Lawrence et al. |
| 4,738,305 A * | 4/1988 | Bacchus ............. 165/48.2 |
| 4,748,821 A * | 6/1988 | Berenter ............. 62/188 |
| 4,785,640 A * | 11/1988 | Naruse ............. 62/196.4 |
| 4,796,436 A * | 1/1989 | Voorhis et al. ............. 62/77 |
| 4,865,124 A | 9/1989 | Dempsey |
| 4,959,971 A * | 10/1990 | Minari ............. 62/197 |

(Continued)

FOREIGN PATENT DOCUMENTS

CN    1212352    3/1999

(Continued)

OTHER PUBLICATIONS

International Search Report from PCT/KR2007/002498, dated Apr. 15, 2009.

(Continued)

*Primary Examiner* — Frantz Jules
*Assistant Examiner* — Daniel C Comings
(74) *Attorney, Agent, or Firm* — McKenna Long & Aldridge LLP

(57) ABSTRACT

A water-cooled air conditioner is provided, and includes an indoor unit, an outdoor unit, a cooling tower, and a boiler. The indoor unit cools or heats a space, and includes a first heat exchanger that performs heat exchange between air and refrigerant. The outdoor unit is installed separately from the indoor unit and includes a second heat exchanger that performs heat exchange between water and refrigerant. The cooling tower is connected to the outdoor unit, and cools water flowing to the second heat exchanger. The boiler is connected to the outdoor unit, and increases a temperature of the water flowing to the second heat exchanger. The second heat exchanger is formed with a plurality of thin plates separated from one another by predetermined gaps through which refrigerant and water flow. The second heat exchanger includes an anti-freezing device that prevents freezing of water within the second heat exchanger.

12 Claims, 22 Drawing Sheets

U.S. PATENT DOCUMENTS

| | | | |
|---|---|---|---|
| 5,761,921 A * | 6/1998 | Hori et al. | 62/238.4 |
| 6,276,152 B1 | 8/2001 | Sibik | |
| 7,040,380 B1 | 5/2006 | O'Brien | |
| 7,340,912 B1 | 3/2008 | Yoho et al. | |
| 2004/0188082 A1* | 9/2004 | Riello | 165/219 |
| 2005/0028545 A1 | 2/2005 | Hebert | |
| 2005/0091998 A1 | 5/2005 | Cho et al. | |
| 2005/0092000 A1* | 5/2005 | Hwang et al. | 62/193 |
| 2005/0210910 A1* | 9/2005 | Rigney et al. | 62/407 |
| 2005/0217292 A1* | 10/2005 | Onishi et al. | 62/197 |
| 2006/0117768 A1* | 6/2006 | Lee et al. | 62/151 |
| 2006/0117773 A1* | 6/2006 | Street et al. | 62/213 |
| 2006/0123834 A1* | 6/2006 | Hwang et al. | 62/470 |
| 2007/0000274 A1 | 1/2007 | Li | |

FOREIGN PATENT DOCUMENTS

| | | |
|---|---|---|
| CN | 1782559 | 6/2006 |
| EP | 1780479 | 5/2007 |
| JP | 07-049195 | 2/1995 |
| JP | 2001-272115 | 10/2001 |
| KR | 10-2001-0067995 | 7/2001 |
| KR | 10-2001-0090934 | 10/2001 |
| KR | 10-2002-0020392 | 3/2002 |

OTHER PUBLICATIONS

Office Action of the U.S. Patent Office in U.S. Appl. No. 11/806,457, dated Jan. 11, 2012.

* cited by examiner

WATER-COOLED AIR CONDITIONER

This application claims the benefit of Korean Patent Application No. 10-2006-0100610, filed on Oct. 17, 2006, which is hereby incorporated by reference for all purposes as if fully set forth herein.

BACKGROUND OF THE INVENTION

1. Field of the Invention

The present invention relates to a water-cooled air conditioner, and more particularly, to a water-cooled air conditioner with a plate type heat exchanger in which refrigerant and cooling water flow against each other, and an anti-freezing device and a flow sensing device for easily assessing freezing and the flow of water.

2. Description of the Related Art

Generally, an air conditioner is a cooling/heating apparatus that cools or heats the air inside an indoor space of an office, home, etc. An air conditioner uses a refrigerant cycle in the sequence of compression-condensation-expansion-evaporation to exchange heat between refrigerant and air to cool or heat air within a specific space.

Recently, air conditioners are being manufactured with not only basic cooling and heating functions, but other functions such as air purifiers that suction and filter contaminated indoor air and discharge clean air, dehumidifiers that convert humid air to dry air and discharge the latter back into an indoor space, and various other functions that ameliorate living.

Also, air conditioners can be divided into split air conditioners that have separate indoor units and outdoor units, and single unit air conditioners that integrate the indoor unit with the outdoor unit. Due to installation space and noise considerations, the split air conditioner is the preferred type today.

Instead of air-cooled air conditioners that use air to exchange heat with refrigerant to condition the air inside an indoor space, increased research and development is being done on water-cooled air conditioners that use water to exchange heat with refrigerant to condition the air inside an indoor space. This water-cooled type of air conditioner is a device that is favored as an alternative to the excessive power consumption of air-cooled air conditioners.

Also, when compared to air-cooled air conditioners, water-cooled air conditioners can be made smaller in size, generate less noise, and condition air more effectively; and due to the increase in the construction of large buildings and complexes such as apartments, the development and production of water-cooled air conditioners is increasing.

However, water-cooled air conditioners according to the related art still have many drawbacks.

For example, in water-cooled air conditioners according to the related art, cooling water and refrigerant are respectively separated while flowing through the inside of a heat exchanger. Thus, the cooling water that flows separately from refrigerant is prone to freeze during winter within the water-cooled air conditioner.

When cooling water freezes within a heat exchanger, the volume of the cooling water expands and damages the heat exchanger. A damaged heat exchanger requires repair expenses.

Furthermore, in a water-cooled air conditioner according to the related art, not being able to check the flowing state of the cooling water is a problem. Accordingly, when the flow of cooling water is restricted by the buildup of impurities in cooling water over prolonged use, the heat exchanger can be damaged.

Additionally, in this type of water-cooled air conditioner according to the related art, because refrigerant and cooling water flow in the same direction during either the cooling or heating cycle, the efficiency of heat exchanging is reduced.

SUMMARY OF THE INVENTION

Accordingly, the present invention is directed to a water-cooled air conditioner that substantially obviates one or more problems due to limitations and disadvantages of the related art.

An object of the present invention is to provide a water-cooled air conditioner with an anti-freezing device for preventing freezing of water flowing through a heat exchanger of an outdoor unit to one side of the heat exchanger.

Another object of the present invention is to provide a water-cooled air conditioner in which water and refrigerant always flow in opposite directions within the heat exchanger provided in an outdoor unit of the air conditioner.

A further object of the present invention is to provide a water-cooled air conditioner with an outdoor unit including a plate shaped heat exchanger having a plurality of thin plates spaced a predetermined distance apart to form spaces through which refrigerant and cooling water flow, and a flow quantity controller for controlling the flow of refrigerant and water that is heat exchanged, according to the load capacity of the indoor space, provided at one side of the heat exchanger.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a water-cooled air conditioner including: an indoor unit including a first heat exchanger that performs heat exchange between air and refrigerant, the indoor unit for cooling or heating a space to be air conditioned; an outdoor unit installed separately from the indoor unit and including a second heat exchanger that performs heat exchange between water and refrigerant; a cooling tower installed in a connected manner to the outdoor unit, for cooling water flowing to the second heat exchanger; and a boiler installed in a connected manner to the outdoor unit, for increasing a temperature of the water flowing to the second heat exchanger, wherein the second heat exchanger is a plate-type heat exchanger formed with a plurality of thin plates separated from one another by predetermined gaps that form spaces through which refrigerant and water flow, and the second heat exchanger includes an anti-freezing device provided at a side thereof for preventing freezing of water within the second heat exchanger.

In another aspect of the present invention, there is provided a water-cooled air conditioner including: a plurality of indoor units including a first heat exchanger that performs heat exchange between air and refrigerant, the plurality of indoor units for cooling or heating spaces to be air conditioned; and an outdoor unit installed separately from the indoor units and including a second heat exchanger that performs heat exchange between water and refrigerant; wherein the second heat exchanger is a plate-type heat exchanger formed with a plurality of thin plates separated from one another by predetermined gaps that form spaces through which refrigerant and water flow, and the second heat exchanger includes a direction controller provided at a side thereof, for maintaining the flow of refrigerant and water within the second heat exchanger in mutually opposite directions.

In a further aspect of the present invention, there is provided a water-cooled air conditioner including: an indoor unit including a first heat exchanger that performs heat exchange between air and refrigerant, the indoor unit for cooling or heating a space to be air conditioned; and an outdoor unit installed separately from the indoor unit and including a second heat exchanger that performs heat exchange between water and refrigerant; wherein the second heat exchanger is a plate-type heat exchanger formed with a plurality of thin plates separated from one another by predetermined gaps that form spaces through which refrigerant and water flow, and is installed horizontally, and the second heat exchanger includes flow quantity controller provided at a side thereof, for controlling a flow quantity of water that exchanges heat with refrigerant, according to a load of an indoor space.

In the above described water-cooled air conditioner according to the present invention, a plate type heat exchanger for heat exchanging water and refrigerant is provided, which includes an anti-freezing device and a refrigerant direction controller installed therein. Also installed is a plurality of overcoolers and water supply controllers, and a plurality of even flow pipes installed in a plurality of compressors. Hence, in the anti-freezing device, freezing of water flowing through a second heat exchanger can be prevented to prevent damage to the air conditioner. Because freezing of the air conditioner is prevented, repair and maintenance costs of the air conditioner can be extensively saved.

Also, because the refrigerant direction controller ensures that the flow of refrigerant and water flowing through the inner space of the second heat exchanger is always in opposite directions, heat exchanging efficiency between refrigerant and water increases. Because the heat exchanging efficiency increases between refrigerant and water, the effectiveness of cooling and heating indoor spaces increases; and when the effectiveness of cooling and heating increases, the energy expended to cool and heat the indoor space is effectively reduced.

Additionally, according to the heat exchanging between the refrigerant and the water, the size of the air conditioner can be compacted so that it can be applied to large buildings and apartment complexes without installing multiple outdoor units to the buildings and damaging the outsides of the buildings.

Furthermore, because it is possible to air condition indoor spaces according to their respective required loads, efficiency in energy consumption increases, and convenience in use also increases.

Additionally, because it is possible to supply fresh outdoor air into indoor spaces, it is possible to reduce contamination of indoor air, thereby improving a user's health by decontaminating indoor air.

Further, maintenance of the air conditioner through central maintenance increases user convenience.

It is to be understood that both the foregoing general description and the following detailed description of the present invention are exemplary and explanatory and are intended to provide further explanation of the invention as claimed.

DETAILED DESCRIPTION OF THE INVENTION

Reference will now be made in detail to the preferred embodiments of the present invention, examples of which are illustrated in the accompanying drawings. The invention may, however, be embodied in many different forms and should not be construed as being limited to the embodiments set forth herein.

Figure 1:
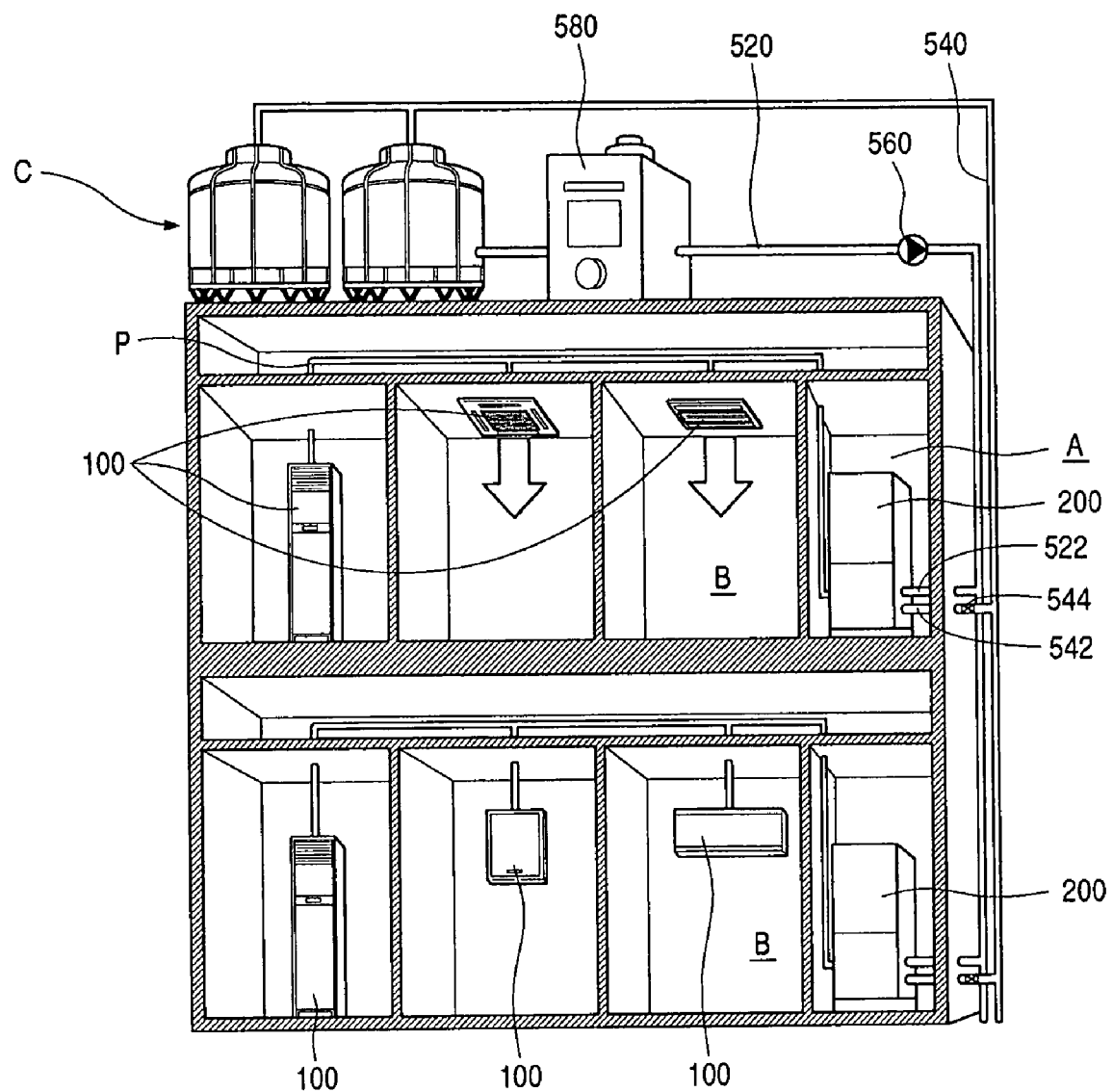
FIG. 1 is a perspective view showing the configuration of a water-cooled air conditioner according to the present invention installed in a building.

FIG. 1 is a perspective view showing the configuration of a water-cooled air conditioner according to a preferred embodiment of the present invention installed in a building. That is, a split system water-cooled air conditioner having separately installed indoor and outdoor units is installed in a building.

As shown in FIG. 1, the inside of the building is divided into air conditioning rooms (A) and indoor spaces (B). That is, the building is divided into air conditioning rooms (A) in which air conditioning equipment is installed, and a plurality of indoor spaces (B) in which people live or work. Accordingly, outdoor units 200 that are usually installed outside the building are installed in the air conditioning rooms (A), and indoor units 100 are installed in the indoor spaces (B).

Various types of indoor units 100 are installed in each indoor space (B) to condition the air in the indoor spaces. That is, the indoor units 100 include standing units, ceiling mounted units, wall mounted units, and other types, of which users may choose an appropriate model to be installed at an appropriate location. These indoor units 100 are installed to communicate with the outdoor units 200 through refrigerant pipes (P). The refrigerant pipes (P) guide the flow of refrigerant between the indoor units 100 and the outdoor units 200.

An indoor unit 100 suctions the air from within an indoor space (B), performs heat exchanging between the air and refrigerant, and reintroduces the heat exchanged air to the indoor space (B), so that the air within the indoor space (B) is conditioned according to the intentions of a user. The indoor unit (100) is formed in a shape suitable for its indoor space (B).

The indoor units 100 and outdoor units 200 are connected by the refrigerant pipes (P) that guide the flow of refrigerant (that is a working fluid). The refrigerant pipe (P) are cylindrical pipes having a predetermined diameter, and branch off from discharge pipes connected to the outdoor units 200 to each of the indoor units 100.

A cooling tower (C) is installed on a roof, etc. of a building in which a water-cooled air conditioner according to the present invention is installed, in order to cool water to produce cooling water. The cooling tower (C) allows the water to directly contact air to produce the cooling water. That is, when water contacts cold air, a portion of the water evaporates, and the heat required for the evaporation is lost to the air, lowering the water temperature. Using this phenomenon, water is directed from the top downward within the cooling tower (C), and air is discharged from the lower end to cool the water and produce cooling water.

The water cooled within the cooling tower (C) is guided by a water supply pipe 520 to the inside of the outdoor units 200. The water supply pipe 520 is a hollow cylindrical pipe with a predetermined diameter, and is installed along the outer wall of the building. A water return pipe 540 with the same shape as the water supply pipe 520 is installed beside the water supply pipe 520, in order to guide the return of the water that has exchanged heat with refrigerant within the outdoor units 200 back to the cooling tower (C).

Accordingly, the water that is cooled within the cooling tower (C) is guided by the water supply pipe 520 to flow into the outdoor units 200, and the water that exchanges heat with the refrigerant within the outdoor units 200 is guided by the water return pipe 540 back to the top of the cooling tower (C), after which it is cooled again within the cooling tower (C) to repeat the cycle of returning to the inside of the outdoor units 200.

A cooling water pump 560 is installed in the water supply pipe 520 to supply the water cooled in the cooling tower (C) to the respective outdoor units 200 at a uniform pressure. This pump ensures that a water flows through the insides of the outdoor units 200 at a predetermined pressure to maintain a uniform flow rate of water.

The water supply pipe 520 and the water return pipe 540 are installed along the outer walls of the building, and branch off to the respective outdoor units 200 to supply water into each outdoor unit 200. That is, a water supply branch pipe 522 and a water return branch tube 542 branch off respectively from the water supply pipe 520 and the water return pipe 540 to each respective outdoor unit 200, of which the branch tubes are installed to pass through the sides of the air conditioning rooms (A).

Thus, one end of the water supply branch pipe 522 that branches from the water supply pipe 520 to supply water into the outdoor unit 200 communicates with the water supply pipe 520, and the other end is inserted inside the outdoor unit 200. Also, the end of the water return branch pipe 542 that is inserted inside the outdoor unit 200 is formed to communicate with the water return pipe 540.

A water return valve 544 is installed in the water return branch pipe 542 to control the water supplied from the cooling tower (C) to the inside of the outdoor units 200 to return through the water return branch pipe 542 after exchanging heat with the refrigerant.

That is, when the air conditioner is used and operated normally, the water return valve 544 is opened so that water that has exchanged heat with refrigerant within the air conditioner is returned to the cooling tower (C). When one air conditioner installed in one of a plurality of floors is not being used, the water return valve 544 is closed so that the water that fills the interior of the air conditioner does not return to the cooling tower (C).

The reason that the water filled inside the air conditioner is not returned to the cooling tower (C) is that when the air conditioner that was not operating is suddenly operated, in the initial operation of the air conditioner, the water that filled the air conditioner exchanges heat to cool refrigerant and becomes hot. When the hot water flows into a compressor (to be described), the compressor can be damaged (which is prevented by the closed water return valve 544.)

A boiler 580 is provided to one side of the cooling tower (C). The boiler 580 operates during heating operation of the air conditioner, use of hot water, or to prevent freezing of water. Here, water that is cooled in the cooling tower (C) passes through the boiler 580 on its way to the outdoor units 200.

The configuration of an indoor unit 100 is virtually the same as that of conventional air-cooled multi-unit air conditioners, for which a brief description will be given.

A first heat exchanger (not shown) is installed within the indoor unit 100 to perform heat exchanging between air suctioned from an indoor space and refrigerant to condition the air of the interior space in which the indoor unit 100 is installed. Refrigerant flows through the inside of this type of first heat exchanger (not shown).

The intake side of the first heat exchanger (not shown) is provided with an expansion valve (not shown). The expansion valve expands the refrigerant to perform depressurizing of the refrigerant.

The refrigerant pipe (P) includes a high pressure pipe through which high pressure refrigerant flows, and a low pressure pipe through which low pressure refrigerant flows. The refrigerant pipe (P) branches out to each indoor unit 100 from the outdoor units 200, and guides the flow of refrigerant to the inside of the first heat exchanger (not shown).

Thus, the refrigerant exchanges heat with water inside the outdoor unit 200, and the refrigerant that has exchanged heat flows through the refrigerant pipe (P) and flows to the first heat exchanger (not shown) installed in the indoor unit 100, upon which it exchanges heat with air suctioned into the indoor unit 100 from the indoor space (B). The air that has exchanged heat with refrigerant passing through the first heat exchanger (not shown) and is conditioned is then discharged back to the indoor space (B) to condition the indoor space (B).

Also, refrigerant repeatedly flows between the indoor and outdoor units 100 and 200 to complete a cycle, and water that exchanges heat with the refrigerant inside the outdoor unit 200 is guided through the water return branch pipe 542 to the water return pipe 540, through which it flows inside the cooling tower (C) to also complete a cycle.

Below, a description will be given of an outdoor unit of a multi-unit air conditioner, with reference to the diagrams.

Figure 2:
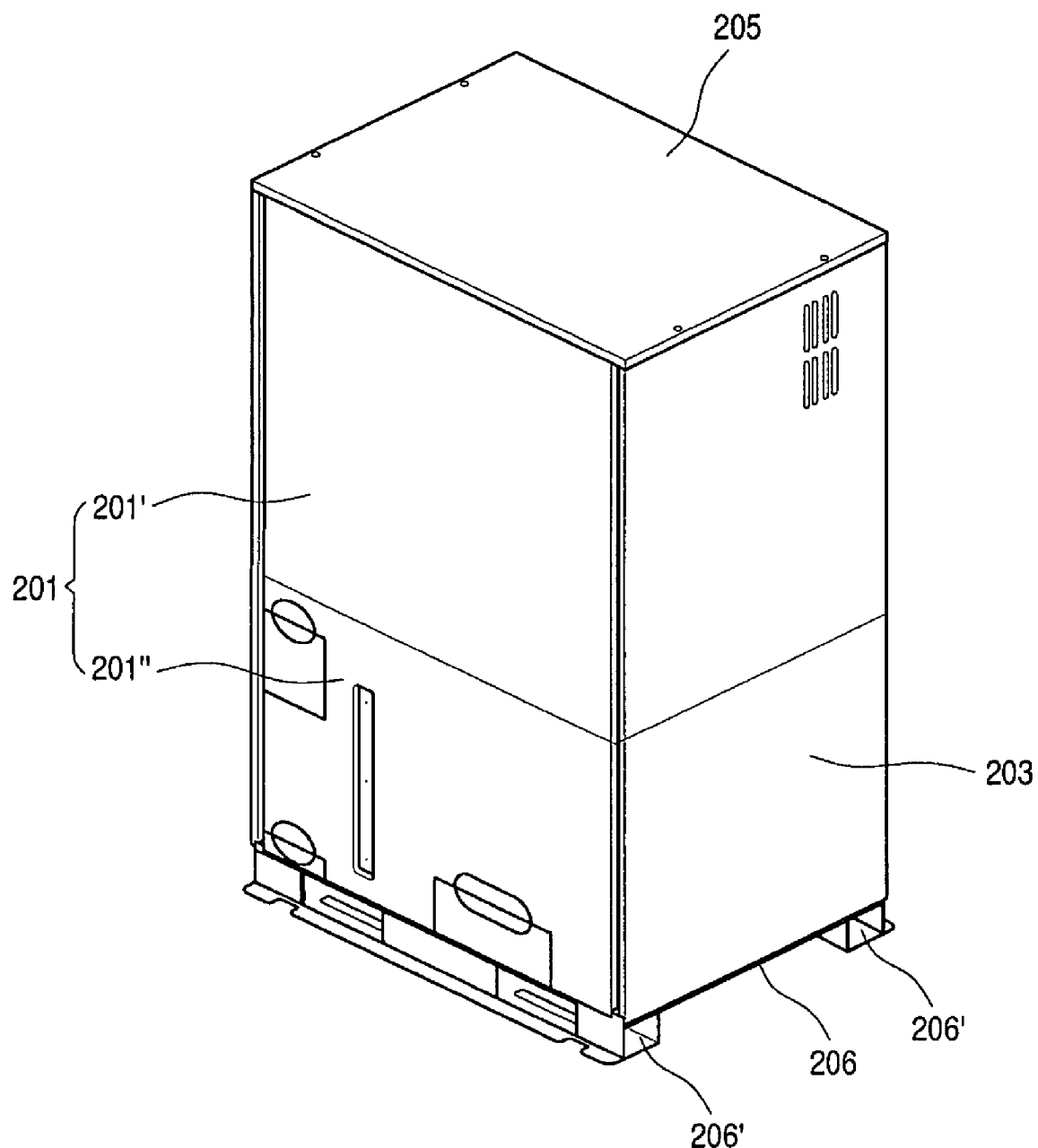
FIG. 2 is a perspective view of an outdoor unit of a water-cooled air conditioner according to the present invention.
Figure 3:
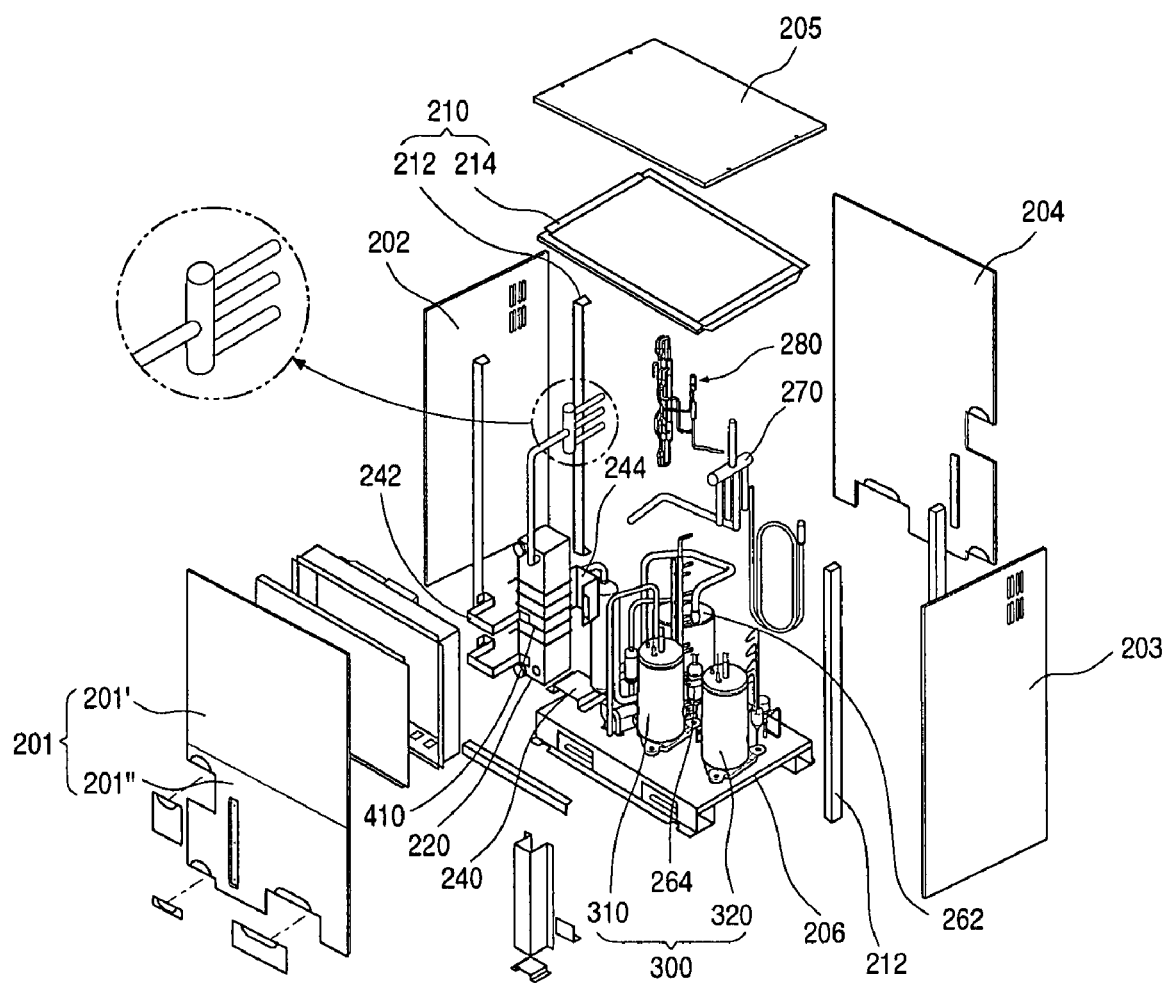
FIG. 3 an exploded perspective view of an outdoor unit of a water-cooled air conditioner according to the present invention.

FIG. 2 is a perspective view of an outdoor unit of a water-cooled air conditioner according to the present invention, and FIG. 3 an exploded perspective view of an outdoor unit of a water-cooled air conditioner according to the present invention.

Referring to FIGS. 2 and 3, to describe an outdoor unit of a multi-unit water-cooled air conditioner in detail, the outdoor unit 200 is installed in an air conditioning room (A) and connected to the first heat exchanger (not shown) of the indoor unit 100 through the refrigerant pipe (P). The outdoor unit 200 is hexahedral in overall outer shape.

The outdoor unit 200 includes a front panel 201 forming the front outer surface (FIG. 2) thereof, a left panel (FIG. 3) forming the left outer surface thereof, a right panel 203 forming the right outer surface thereof, a rear panel 204 (FIG. 3) forming the rear outer surface thereof, an upper panel 205 forming the upper outer surface thereof, and a base 206 forming the lower outer surface thereof. The five panels and the base are fastened together.

Accordingly, when the outdoor unit 200 forms a predetermined inner space, a plurality of components for conditioning air in the indoor space are installed in the inner space.

The front panel 201 is formed of an upper front panel 201' and a lower front panel 201" installed below the upper front panel 201', in order to facilitate servicing of the unit.

The front panel 201 and the rear panel 204 are correspondingly formed such that the front panel 201 and the rear panel 204 may be switched if the need arises. Also, the left panel 202 and the right panel 203 are also correspondingly formed so that they may be switched as well.

Because the front and rear panels 201 and 204 and the left and right panels 202 and 203 are correspondingly formed in switchable pairs, the ease of assembling the outdoor unit 200 increases, and each panel becomes easier to manufacture so that manufacturability of the overall product increases.

The base 206 forming the lower outer portion of the outdoor unit 200 is a rectangularly shaped plate with a predetermined thickness, and has a base supporting portion 206' formed in an elongated square tube shape horizontally below the base 206 at the front and rear thereof.

The base supporting portion 206 has a fork hole (not shown) formed therein to allow the forks of a forklift to be inserted transversely therein, and also distances the bottom surface of the base 206 a predetermined distance from a ground surface. Thus, moving and transporting the outdoor unit 200 becomes easier.

Each panel forming the outer surface of the outdoor unit 200 is approximately rectangular in shape, and are fastened to a frame 210. The frame 210 includes vertical frames 212 extending upward from the corners of the upper surface of the base 206, and horizontal frames 214 fastened to the upper ends of the vertical frames 212 to connect the upper ends of the vertical frames 212.

The vertical frames 212 are horizontally formed in an elongated square plate shape with a predetermined thickness, and are bent in corresponding directions to each of the corners. Thus, the inner surfaces of each panel contact and are fastened to the outer surfaces of the vertical frames 212 bent in corresponding directions to each of the corners, thereby forming the outer surface of the outdoor unit 200.

A second heat exchanger 220 that exchanges heat between refrigerant and water is installed on the upper surface of the base 206. The second heat exchanger 220 is hexahedral in overall shape and extends vertically, and forms a predetermined space within. The inner space of the second heat exchanger 220 has a plurality of thin plates within with predetermined gaps therebetween to form spaces between the thin plates. Refrigerant and water flow through these spaces.

That is, when refrigerant flows from top to bottom in the foremost of the spaces formed between the plurality of thin plates provided within the second heat exchanger 220, water flows from the bottom to top within the space immediately rearward to the foremost space through which refrigerant flows. In the next space rearward, refrigerant flows again, from top to bottom. Accordingly, refrigerant and water flow in respectively opposite directions, and the heat transferred through the thin plates is exchanged between the refrigerant and water.

The second heat exchanger 220 has an anti-freezing device provided within for preventing water from freezing.

Below, a description of the above anti-freezing device will be given. The anti-freezing device is a device for preventing the freezing of water within the second heat exchanger 220, and may consist of a heater, a refrigerant bypassing device, or various other devices.

First, a description of a heating device used for an anti-freezing device will be given.

As shown in the diagrams, a heater 410 is installed on the second heat exchanger 220. The heater 410 is wound around the outside of the second heat exchanger 220, and generates heat through a electrical power supplied from an outside source. This heater 410 is but one example of a heating device, and many other kinds of heaters may be employed.

The heater 410 can selectively heat the second heat exchanger 220 during winter when the outside temperature is cold, and prevent damage to the second heat exchanger 220 due to freezing. That is, when the temperature of water within the second heat exchanger 220 falls below a set temperature, the heater 410 may be selectively turned on to generate heat and prevent freezing of the water within the second heat exchanger 220.

Figure 11:
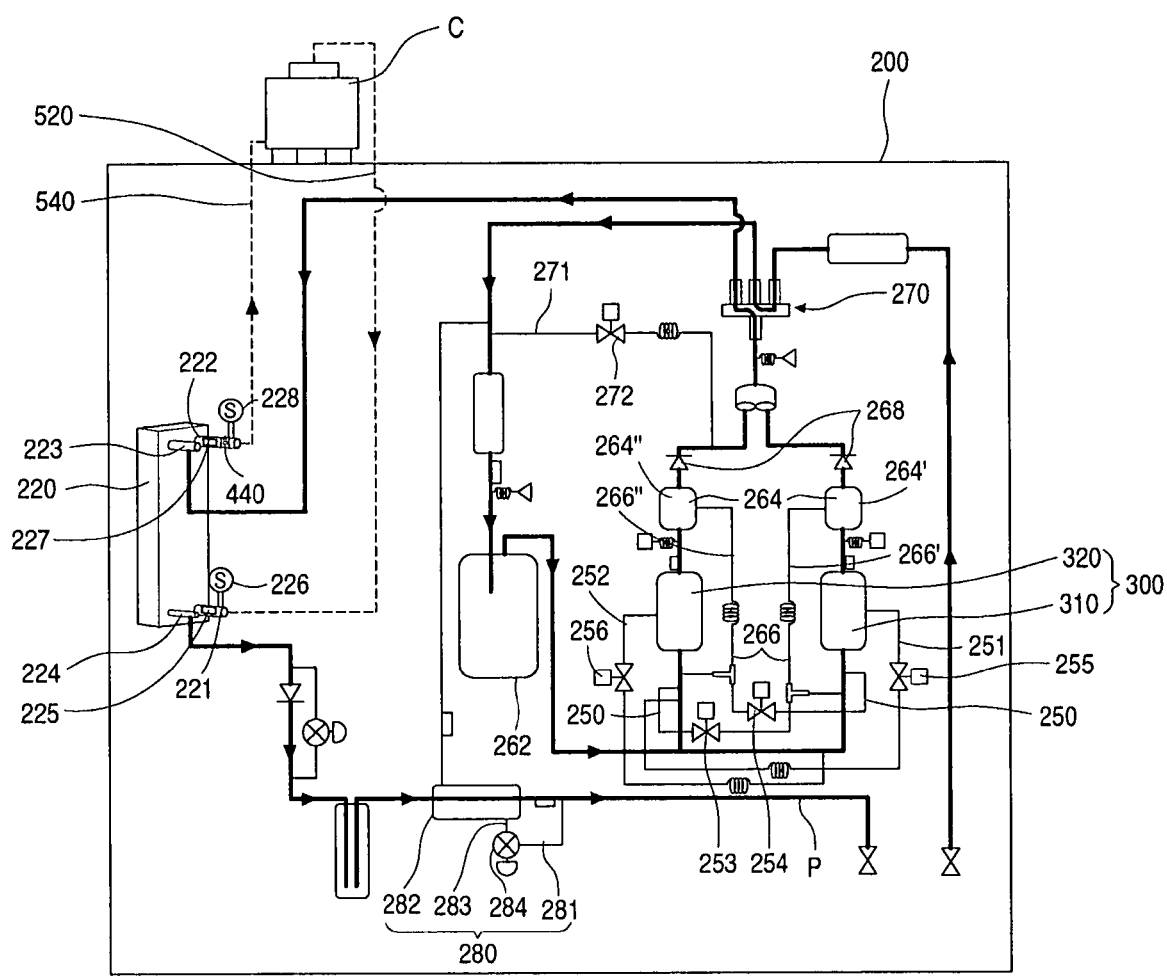
FIG. 11 is a schematic view showing a flow sensor provided in a water-cooled air conditioner according to the present invention and the flow of refrigerant during cooling operation.

Also, the heater 410 is linked to a water supply temperature sensor 225 (FIG. 11). That is, the water supply temperature sensor 225 senses the temperature of water supplied into the second heat exchanger 220. The temperature of the water sensed by the water supply temperature sensor 225 is continuously relayed to a main micom (not shown).

As such, when the temperature of the water is 0° C., the main micom applies power to the heater 410 that is the anti-freezing device. The heater 410 radiates heat due to the applied power, and the heat radiated by the heater 410 heats the second heat exchanger 220 to prevent the water supplied into the second heat exchanger 220 from freezing.

Accordingly, during winter or a prolonged period of non-use when the outdoor temperature falls below 0° C., the anti-freezing device prevents damage incurred to the second heat exchanger 220 by water freezing.

The second heat exchanger 220 is fixed to the top surface of the base 206 by an installing bracket 240. The front portion of the second heat exchanger 220 is fixed by a front fixing bracket 242 that fixes the front portion of the second heat exchanger 220, and the rear portion is fixed by a rear fixing bracket 244 that fixes the rear portion of the second heat exchanger 220.

The front fixing bracket 242 is provided in plurality, and is formed of a rectangular plate with a predetermined thickness that is horizontally elongated and does not extend vertically. The central portion is recessed in a forward direction, and the left and right ends are respectively bent toward the left and right directions. The front portion of the second heat exchanger 220 contacts and is fixed to the rear surface of the central portion of the front fixing bracket 242.

The rear fixing bracket 244 is formed of a rectangular plate with a predetermined thickness, has a central portion that is recessed rearward, and has left and right ends that are respectively bent toward the left and right. The rear portion of the second heat exchanger 220 contacts and is fixed to the front surface of the central portion of the rear fixing bracket 244.

A compressor 300 for compressing refrigerant to a high temperature and pressure is installed to one side of the second heat exchanger 220. The compressor 300 is cylindrically shaped with a predetermined diameter and height, and is provided in plurality, with a constant speed compressor 310 on the left that operates at a constant speed, and a high pressure scroll inverter compressor 320 on the right that operates variably according to the load.

This compressor 300 operates differently according to the load imposed by an indoor space. That is, when the load is small, only the inverter compressor 320 operates; and when the load gradually increases so that the inverter compressor 320 is overloaded, the constant speed compressor 310 operates as well.

Since the constant speed compressor 310 is a conventional scroll type compressor, a detailed description thereof will not be given. The inverter compressor 320 is a high pressure type scroll compressor, of which a detailed description will be given below.

An oil restoring pipe 250 (FIG. 6) is installed between the constant speed compressor 310 and the inverter compressor 320 to communicate the constant speed compressor 310 and the inverter compressor 320. The oil restoring pipe 250 functions to restore oil to one of the compressors 300 from the other compressor when a shortage of oil is about to occur in the one compressor 300, thus preventing damage to the compressor 300.

An accumulator 262 is provided to one side of the compressors 300. The accumulator 262 is formed in a cylindrical shape with a predetermined diameter, and filters refrigerant that is in liquid form from the refrigerant flowing into the compressors 300, allowing only refrigerant in gaseous form to flow into the compressors 300.

That is, when refrigerant flowing from the indoor unit 100 into the compressors 300 that has not been evaporated and is still in liquid form enters the compressors 300, the load on the compressors 300 (which compress refrigerant to a high temperature and pressure) increases, damaging the compressors 300.

Therefore, the refrigerant flowing into the compressors 300 passes through the accumulator 262, in which liquid refrigerant is separated from gaseous refrigerant and only the gaseous refrigerant is transferred to the insides of the compressors to be compressed to a high temperature and pressure.

Because the refrigerant that remains in liquid form from the refrigerant that flows through the accumulator 262 is heavier than gaseous refrigerant, the liquid refrigerant is stored at the bottom of the accumulator 262, and only the gaseous refrigerant that is disposed above the liquid refrigerant flows into the compressors 300.

Figure 6:
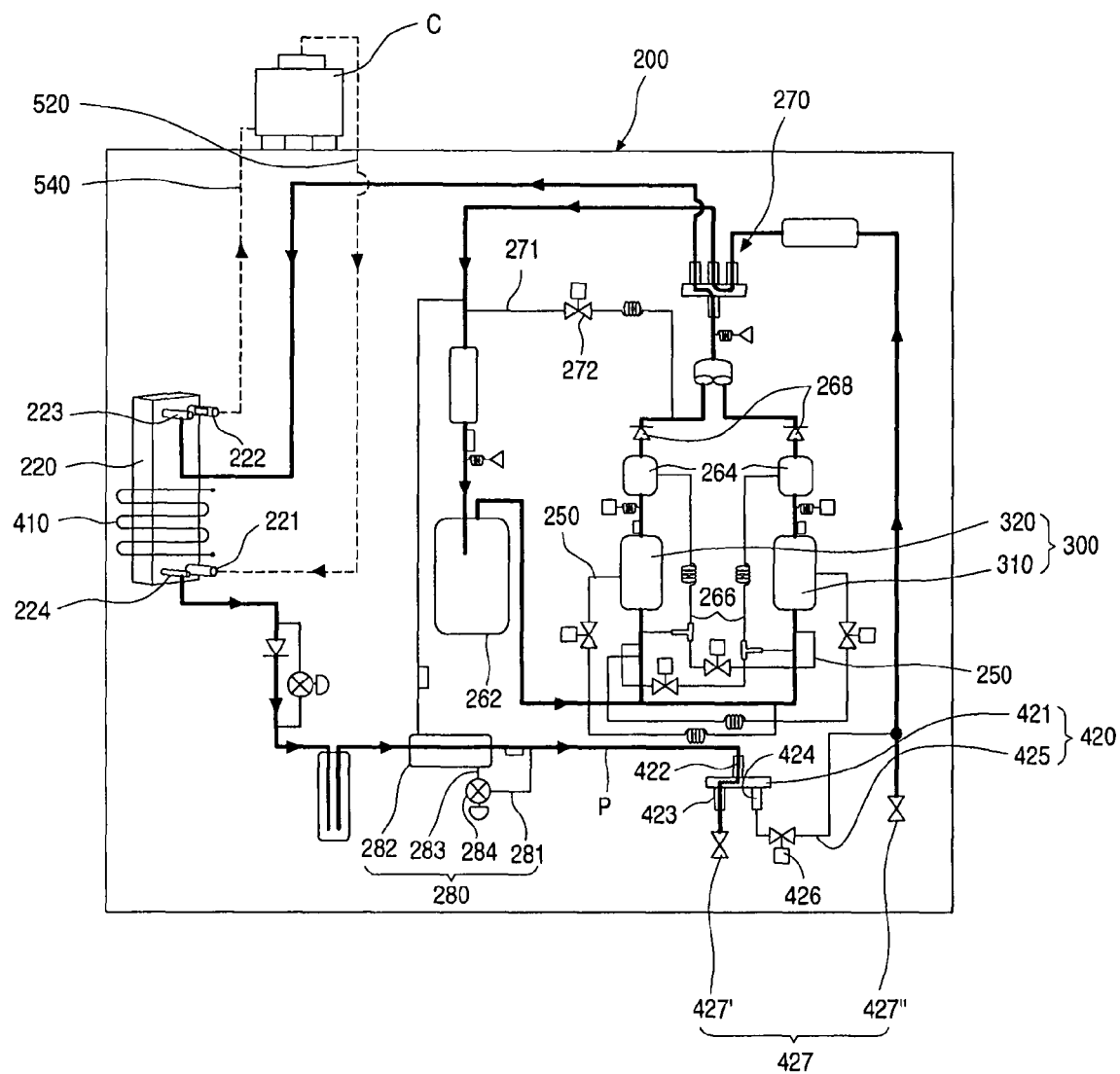
FIG. 6 is a schematic view showing a heater and a refrigerant bypass unit provided in a water-cooled air conditioner according to the present invention and the flow of refrigerant.

An oil separator 264 is provided at the discharging end of the compressors 300, for separating oil included in the refrigerant discharged from the compressors 300. The oil separator 264 is cylindrical in shape, having a predetermined diameter. The oil included in the refrigerant discharged from the compressors 300 that has been used to reduce the friction generated during operation of the compressors 300 is separated from refrigerant as it passes the oil separator 264, and is returned to the compressors 300 through an oil restoring pipe (FIG. 6).

An oil separator check valve 268 (FIG. 6) is further provided at the discharging end of the oil separator 264 to prevent reverse flow of refrigerant. When only one of the constant speed compressor 310 and the inverter compressor 320 is operating, the oil separator check valve 268 prevents reverse flow of compressed refrigerant into the compressor 300 that is not operating.

The oil separator 264 communicates with a main refrigerant valve 270 through a pipe. The main refrigerant valve 270 used is usually a four-way valve that is installed to change the flow direction of refrigerant according to the cooling and heating operation of the air conditioner. The respective ports of the main refrigerant valve 270 are connected to the second heat exchanger 220, the first heat exchanger (not shown), and the accumulator 262.

Accordingly, the refrigerant discharged from the constant speed compressor 310 and the inverter compressor 320 flows into the main refrigerant valve 270, and a hot gas pipe 271 (FIG. 6) is provided between the oil separator 264 and the main refrigerant valve 270 to direct a portion of the refrigerant flowing to the main refrigerant valve 270 directly into the accumulator 262.

When there is a need to raise the pressure of low pressure refrigerant flowing into the accumulator 262 during the operation of the air conditioner, the hot gas pipe 271 supplies high pressure refrigerant discharged from the compressor 300 directly to the accumulator 262. A hot gas valve 272 (FIG. 6) that is a bypass valve is installed on the hot gas pipe 271 to open and close the hot gas pipe 271.

An overcooler 280 is provided to one side of the compressor 300. The overcooler 280 is installed anywhere on a pipe connecting the second heat exchanger 220 and the first heat exchanger (not shown). Refrigerant that passes through the overcooler 280 is cooled a further time therein.

Below, a detailed description of the above-described inverter compressor 320 (that is one of the main components of the present invention) will be provided.

Figure 4:
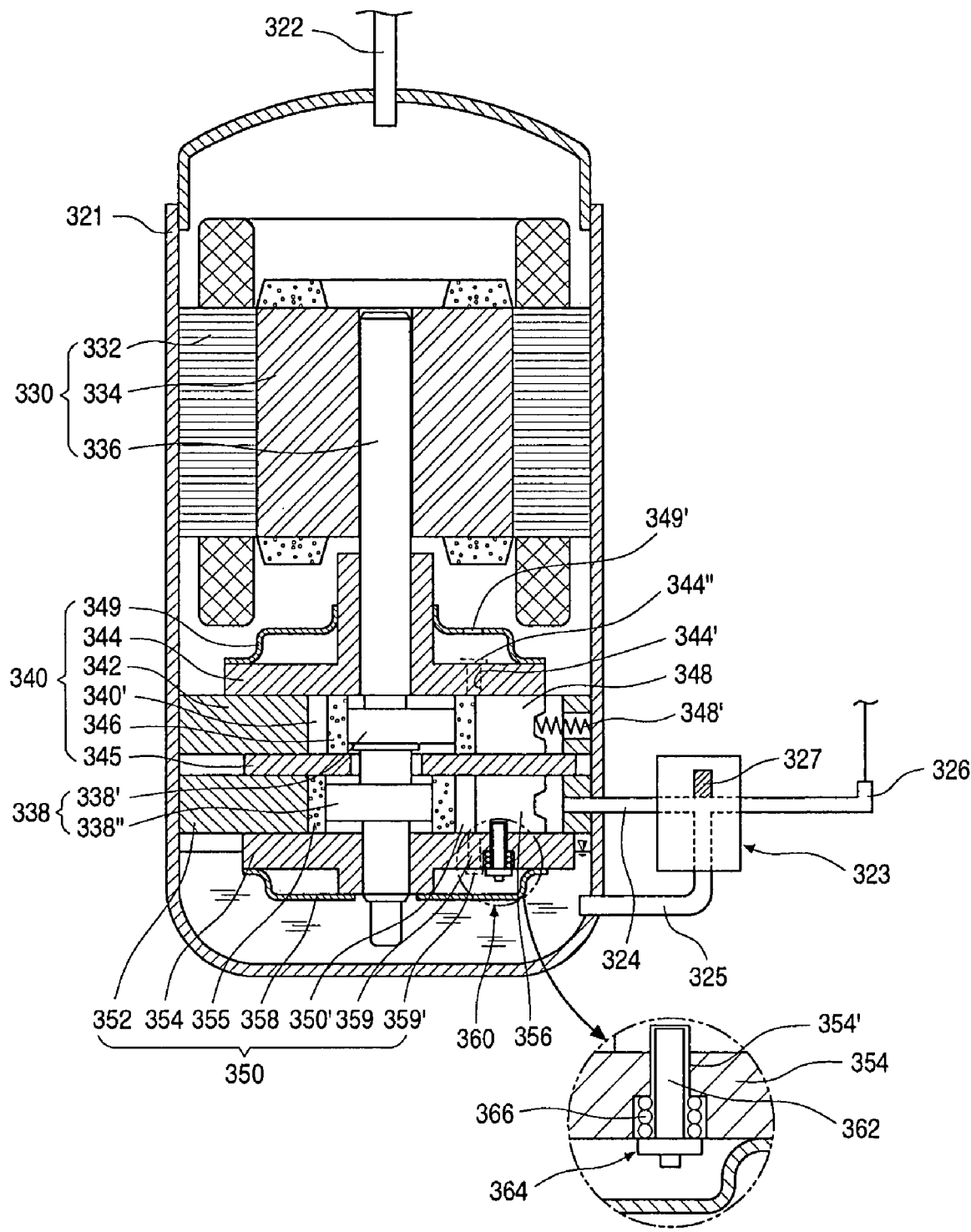
FIG. 4 is a sectional view of a compressor for a water-cooled air conditioner according to the present invention.
Figure 5:
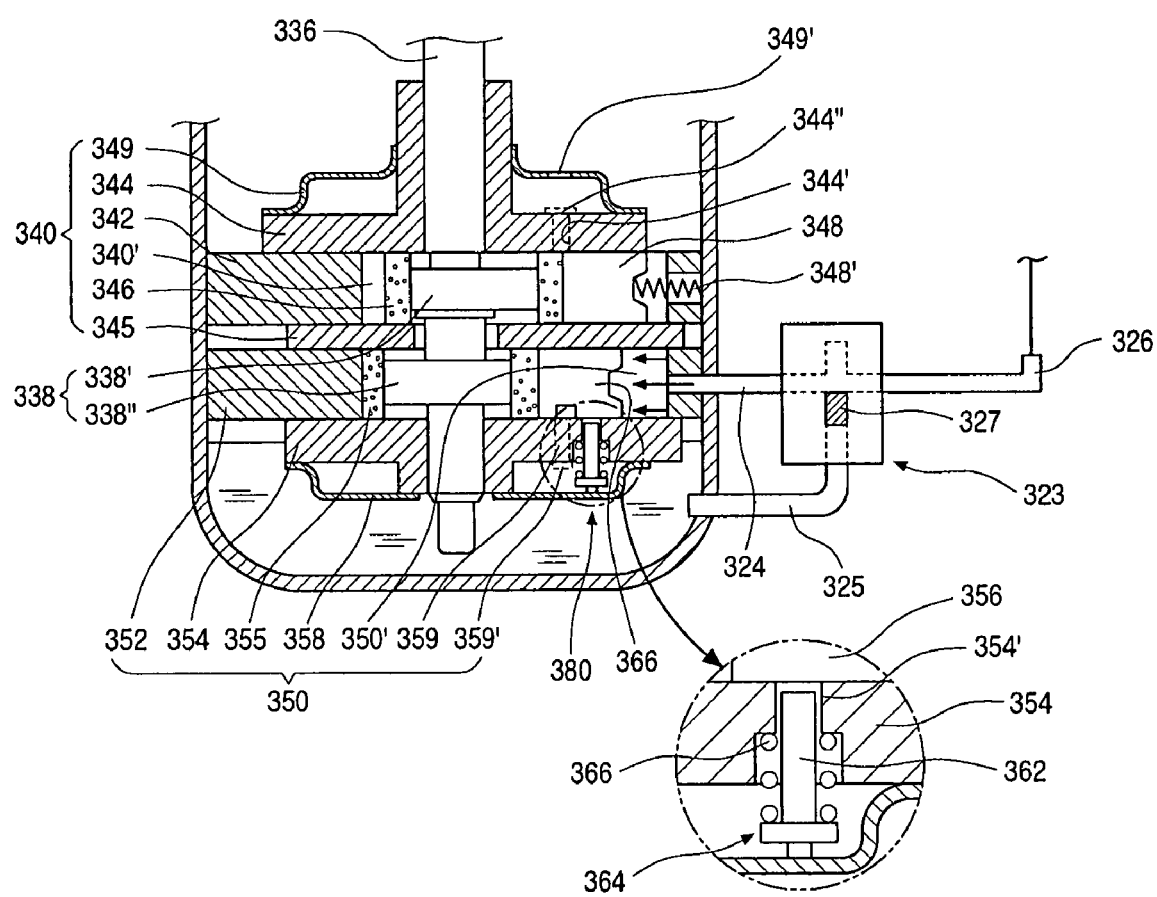
FIG. 5 is sectional view showing a compressor for a water-cooled air conditioner according to the present invention operating normally.

FIG. 4 is a sectional view of a compressor for a water-cooled air conditioner according to the present invention, and FIG. 5 is sectional view showing a compressor for a water-cooled air conditioner according to the present invention operating normally.

Referring to FIGS. 4 and 5, the inverter compressor 320 has a casing 321 forming an outer shape of the inverter compressor 320 and a plurality of compressing spaces 340' and 350' within. A gas discharge tube 322 is formed at the top of the casing 321. The lower end of the gas discharge tube 322 communicates with the inside of the casing 321, and the upper end thereof communicates with the oil separator 264 (FIG. 3).

Provided at the lower right surface of the casing 321 are a shared connecting pipe 324 for guiding the flow of refrigerant into the inverter compressor 320, a high pressure connecting pipe 325 for guiding the flow of oil into the inverter compressor 320, and a low pressure connecting pipe 326 for guiding the flow of gaseous refrigerant discharged from the accumulator 262 to the inverter compressor 320. The shared connecting pipe 324, the high pressure connecting pipe 325, and the low pressure connecting pipe 326 (as components of a vane control unit 323) are configured to selectively communicate with each other.

Specifically, a sealer 327 for selectively sealing the high pressure connecting pipe 325 by sliding up and down is further provided in the vane controlling unit 323. When the sealer 327 is in the position depicted in FIG. 5, the shared connecting pipe 324, the high pressure connecting pipe 325, and the low pressure connecting pipe 326 communicate with one another.

Also, when the sealer 327 slides downward and is disposed within the high pressure connecting pipe 325, the low pressure connecting pipe 326 communicates with the shared connecting pipe 324.

A driving mechanism 330 is provided within the upper half of the casing 321. The driving mechanism 330 generates rotational force to compress refrigerant, and includes a stator 332 which receives electrical power from an outer source, a rotor 334 provided within the stator 332 to electrically interact with the stator 332 and rotate, and a rotating shaft 336 inserted through the center of the rotor 334 for guiding the rotation of the rotor 334.

The rotating shaft 336 is formed longer than the rotor 334 so that is protrudes a predetermined distance from the bottom of the rotor 334. An eccentric portion 338 is provided at the lower portion of the rotating shaft 336 for converting the rotational movement thereof to linear movement.

The eccentric portion 338 includes a first eccentric portion 338' formed at the top and a second eccentric portion 338" formed at the bottom of the eccentric portion 338. The first and second eccentric portions 338' and 338" are fixed eccentrically to the rotating shaft 336 in mutually opposite directions.

A first compressing mechanism 340 and a second compressing mechanism 350 that compress refrigerant through the rotational force transferred by the rotating shaft 336 are further provided at the lower portion of the rotating shaft 336, that is around the first eccentric portion 338' and the second eccentric portion 338".

The first compressing mechanism 340 is disposed above the second compressing mechanism 350, and the second compressing mechanism 350 selectively compresses refrigerant to make the capacity of the inverter compressor 320 variable.

The first compressing mechanism 340 can largely be divided into a tubular first cylinder 342 with its center bored hollow, an upper bearing 344 and a middle bearing 345 sealing the upper and lower ends of the first cylinder 342 to form a first compressing space 3401, a first rolling piston 346 pressed against the outer circumference of the first eccentric portion 338' to compress refrigerant within the first compressing space 340', and a first vane 348 dividing the first compressing space 340' into a first intake chamber (not shown) and a first compressing chamber (not shown).

A first spring 348' is provided to the right of the first vane 348 to elastically support the first vane 348, a first discharge hole 344' is formed vertically through the upper bearing 344, and a first discharge valve 344" for adjusting the amount of pressurized refrigerant that is discharged from the first compressing space 340' is provided at the upper end of the first discharge hole 344'. A first muffler 349 is installed at the upper portion of the first discharge valve 344" to be coupled to the upper bearing 344 and form a space therewith.

Also, a first muffler hole 349' is formed below the first muffler 349, and is opened to allow refrigerant to flow upward. Thus, the compressed refrigerant flows upward from the first compressing space 340' through the first discharge hole 344' into the first muffler 349. The refrigerant that flows into the first muffler 349 flows upward through the first muffler hole 349', and then to the outside of the inverter compressor 320 through the gas discharge pipe 322.

A second compressing mechanism 350 is provided below the first compressing mechanism 340. The second compressing mechanism 350 communicates with the above-described shared connecting pipe 324, and is where refrigerant flows primarily to from the accumulator 262. The second compressing mechanism 350 is the same in structure as the first compressing mechanism 350, and is formed around the second eccentric portion 338".

That is, the second compressing mechanism 350 includes a second cylinder 352 performing the same function as the first cylinder 342, a lower bearing 354 below the second cylinder 352 and forming a second compressing space 350' together with the middle bearing 345, a second rolling piston 355 for compressing refrigerant, a second vane 356 that divides the second compressing space 350' into a second intake chamber (not shown) and a second compressing chamber (not shown), a second muffler 358 coupled at a bottom of the lower bearing 354, a second discharge hole 359 bored in the lower bearing 354 to guide refrigerant compressed in the second compressing space 350', and a second discharge valve 359'.

Accordingly, the refrigerant flowing into the second compressing space 350' is compressed by the rotational movement of the second rolling piston 355 and is then discharged from the second compressing space 350' through the second discharge hole 359.

A capacity changer 360 is provided to the right of the second discharge hole 359 to selectively vary the capacity of the inverter compressor 320. The capacity changer 360 selectively confines the second vane 356 and prevents the second compressing mechanism 350 from operating, to reduce the capacity of the inverter compressor 320.

Specifically, a pin insert hole 354' is bored vertically at the right of the lower bearing 354, and the capacity changer 360 is installed in the pin insert hole 354'. In further detail, the capacity changer 360 has an outer diameter corresponding to the pin insert hole 354', and includes a pin portion 362 that slides vertically and a stopper 364 that restricts the sliding range of the pin portion 362. A pin spring 366 for generating elasticity is provided at the upper end of the stopper 364.

The pin stopper 366 has a compression spring applied thereto and elastically supports the top surface of the stopper 364 in a downward direction. Accordingly, when refrigerant flows to the bottom of the second compressing mechanism 350 through the high pressure connecting pipe 325, pressure is generated at the top of the second muffler 358 so that the pin 362 moves upward.

Also, the upper end of the pin 362 retains a state of insertion into a recessed portion recessed upward from a lower surface of the second vane 356 so that the second compressing mechanism 350 is confined to not operate, and the inverter compressor 320 allows only the first compressing mechanism 340 to operate.

In the water-cooled air conditioner according to the present invention, another embodiment of an anti-freezing device may be applied. In this alternate embodiment, the refrigerant compressed by the compressor 300 is used to prevent water flowing within the second heat exchanger 220 from freezing.

Figure 7:
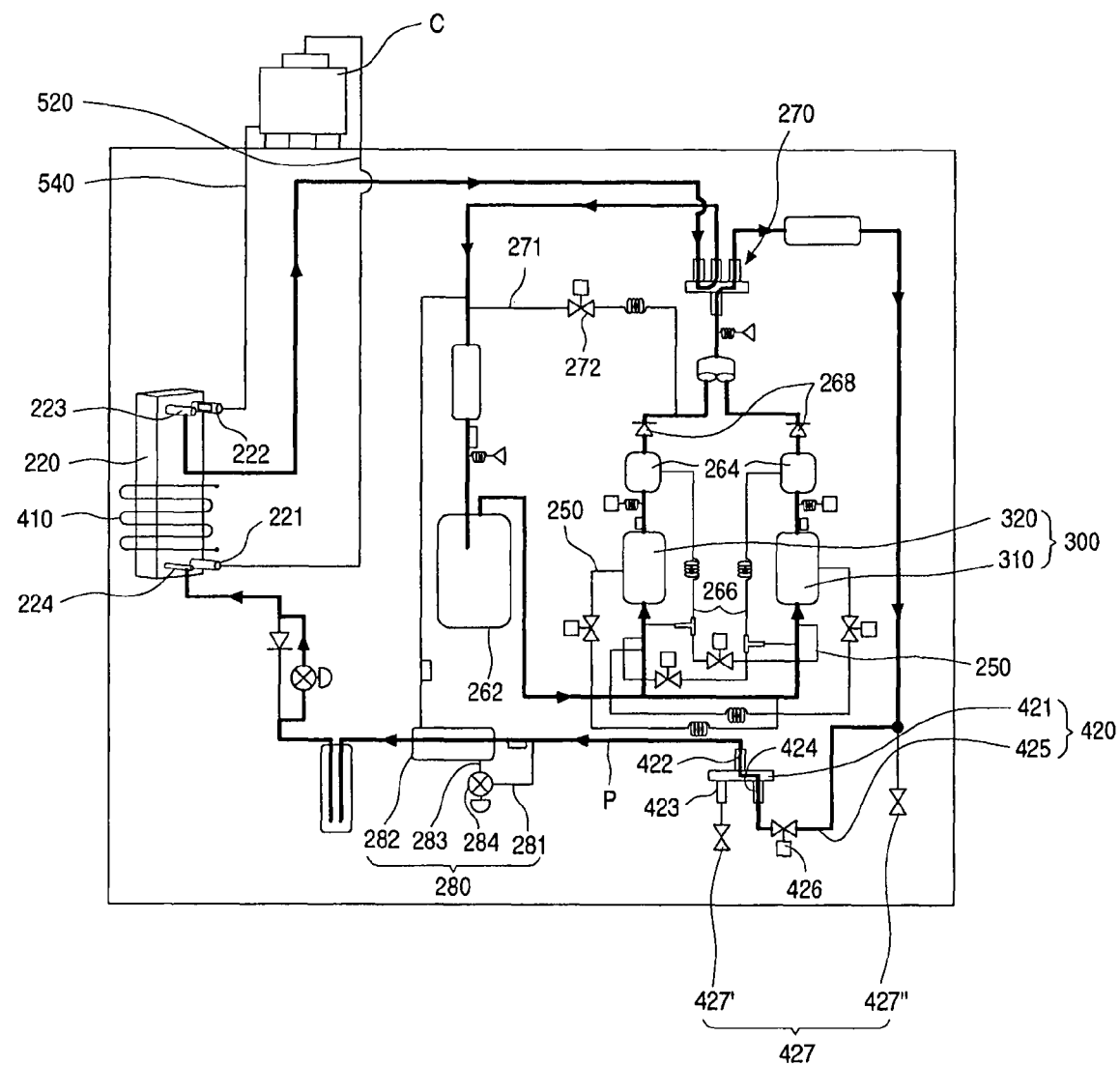
FIG. 7 is a schematic view showing a heater and a refrigerant bypass unit provided in a water-cooled air conditioner according to the present invention during operation and the flow of refrigerant.

FIG. 6 is a schematic view showing a heater and a refrigerant bypass unit provided in a water-cooled air conditioner according to the present invention and the flow of refrigerant, and FIG. 7 is a schematic view showing a heater and a refrigerant bypass unit provided in a water-cooled air conditioner according to the present invention during operation and the flow of refrigerant.

As shown in FIGS. 6 and 7, a refrigerant guider 420 that is another form of anti-freezing device is provided between the end of the refrigerant pipe (FIG. 1) communicating the second heat exchanger 220 and the first heat exchanger (not shown), and a refrigerant pipe (not shown) formed to communicate the first heat exchanger (not shown) and the main refrigerant valve 270.

The refrigerant guider 420, like the heater 410, is connected to the water return temperature sensor 227 (FIG. 11) and operates. That is, when the temperature of water sensed by the water return temperature sensor 227 falls below 0° C., the high temperature and high pressure discharged from the compressor 300 is guided to flow to the second heat exchanger 220.

The refrigerant guider 420 includes a 3-way valve 421 with 3 ports for switching the flow direction of refrigerant, and a refrigerant guide pipe 425 coupled to communicate to one of the ports of the 3-way valve 421 and for guiding the flow of refrigerant from the compressor 300 into the 3-way valve 421.

The 3-way valve 421 includes an intake port 422, a first discharge port 423, and a second discharge port 424. When the intake port 422 is connected to the refrigerant entrance of the second heat exchanger 220, the first discharge port 423 is connected to the first heat exchanger (not shown), and the second discharge port 424 is connected to the pipe connecting the main refrigerant valve 270 with the first heat exchanger (not shown).

Accordingly, when the water return temperature sensor 227 (FIG. 11) transmits the temperature of water to the main micom, the main micom receives the transmitted water temperature and selectively opens and closes the ports of the 3-way valve 421 so that the refrigerant discharged from the compressor 300 passes through the 3-way valve 421 and is guided to the inside of the second heat exchanger 220.

A refrigerant guide valve 426 is installed on the refrigerant guide pipe 425 to selectively open and close the refrigerant guide pipe 425. When the air conditioner is operating in cooling mode, the refrigerant guide valve 426 seals the refrigerant guide pipe 425; and when the air conditioner is operating in heating mode, the refrigerant guide valve 426 opens the refrigerant guide pipe 425 according to the temperature of water sensed by the water return temperature sensor 227 (FIG. 11). When the refrigerant guide valve 426 is opened, the refrigerant discharged from the compressor 300 does not flow to the first heat exchanger (not shown), but flows instead to the second heat exchanger 220.

The end of the first discharge port 423 of the 3-way valve 421 and the end of the refrigerant pipe (P) connected to the first heat exchanger (not shown) have an anti-freezing valve 427 installed thereon. The anti-freezing valve 427 is installed to prevent freezing of water flowing within the second heat exchanger 220 by means of the anti-freezing device 420. When the temperature of the water sensed by the water return temperature sensor 227 is below 0° C., the anti-freezing valve 427 closes so that the refrigerant discharged from the compressor 300 is guided into the second heat exchanger 220.

The anti-freezing valve 427 includes a first preventing valve 427' that blocks the flow of refrigerant from the first heat exchanger (not shown) to the first discharge port 423 of the 3-way valve 421, and a second preventing valve 427" that blocks the flow of refrigerant from the compressor 300 to the first heat exchanger (not shown).

Therefore, the first preventing valve 427' and the second preventing valve 427" operate in reverse of the refrigerant guide valve 426. That is, when the refrigerant guide valve 426 is closed, the first preventing valve 427' and the second preventing valve 427" open; and when the refrigerant guide valve 426 opens, the first preventing valve 427' and the second preventing valve 427" close.

Also, as shown in the diagrams, the overcooler 280 includes a reverse transfer pipe 281 that guides the branched flow of refrigerant from the refrigerant pipe (P), an overcooling device 282 formed as a double pipe, an expander 283 provided in the reverse transfer pipe 281 for expanding refrigerant, and an overcooling valve 284 for selectively opening and closing the reverse transfer pipe 281.

Referring to FIG. 6, the outer structure of the second heat exchanger 220 will be described in further detail.

A water supply portion 221 that is a passage for supplying water into the second heat exchanger is formed to protrude forward from the front, left lower end of the second heat exchanger 220. The water supply portion 221 is formed of a cylindrical pipe with a predetermined diameter, and has an inner space that communicates with the inner space of the second heat exchanger 220.

On the upper end of the water supply portion 221, that is, the front upper surface of the second heat exchanger 220 has a water return portion 222 formed thereon that is a passage for water that has exchanged heat with refrigerant within the second heat exchanger 220 to flow out from the second heat exchanger 220. The water return portion 222 is the same shape as the water supply portion 221.

The end of the water supply portion 221 is connected to the water supply branch pipe 522 and receives water supplied from the cooling tower (C). That is, the water cooled in the cooling tower (C) is guide by the water supply pipe 520 (FIG. 6) to flow through the water supply branch pipe 522 to the water supply portion 221 and inside the second heat exchanger 220.

The end of the water return portion 222 is connected with the water return branch pipe 542 to return water that has exchanged heat to the cooling tower (C). That is, the water that has exchanged heat with refrigerant flows through the water return portion 222 to the outside of the second heat exchanger 220, passes through the water return branch pipe 542, and is guided to return to the cooling tower (C) by the water return pipe 540. The water that returns is cooled again in the cooling tower (C) and re-supplied into the second heat exchanger 220.

A refrigerant discharge intake port 223 and a refrigerant discharge port 224 are formed at one side of the water supply portion 221 and the water return portion 222 (the right side in the drawings), through which refrigerant flows into and out from the second heat exchanger 220. The refrigerant intake port 223 is formed on the right side of the water return portion 222, that is, on the front, right upper portion of the second heat exchanger 220; and the refrigerant discharge port 224 is formed on the right side of the water supply portion 221, that is, the front, right lower portion of the second heat exchanger 220. The refrigerant intake port 223 and the refrigerant discharge port 224 are formed the same as the water supply portion 221 and the water return portion 222.

Furthermore, as shown in the diagrams, the refrigerant intake port 223 and the refrigerant discharge port 224, and the water supply portion 221 and the water return portion 222 may be formed on the same side.

Of course, the refrigerant intake port 223 and the refrigerant discharge port 224, and the water supply portion 221 and the water return portion 222 may be formed in a configuration in which they are not formed on the same side. For example, the refrigerant intake port 223 and the refrigerant discharge port 224 may be formed at opposite sides, and the water supply portion 221 and the water return portion 222 may be formed at opposite sides as well.

The water supply temperature sensor 225 (FIG. 11) for sensing the temperature of water supplied into the second heat exchanger 220, and the water supply pressure sensor 226 (FIG. 11) for sensing the pressure of the supplied water are installed on the water supply portion 221. Also, the water return temperature sensor 227 (FIG. 11) for sensing the temperature of water that has exchanged heat with refrigerant within the second heat exchanger 220, and the water return pressure sensor 228 (FIG. 11) for sensing the pressure of the returned water are installed on the water return portion 222.

Thus, the temperature and pressure of water supplied into the second heat exchanger 220 can be detected, and the temperature and pressure of water that has exchanged heat with refrigerant in the second heat exchanger 220 can be detected.

Figure 8:
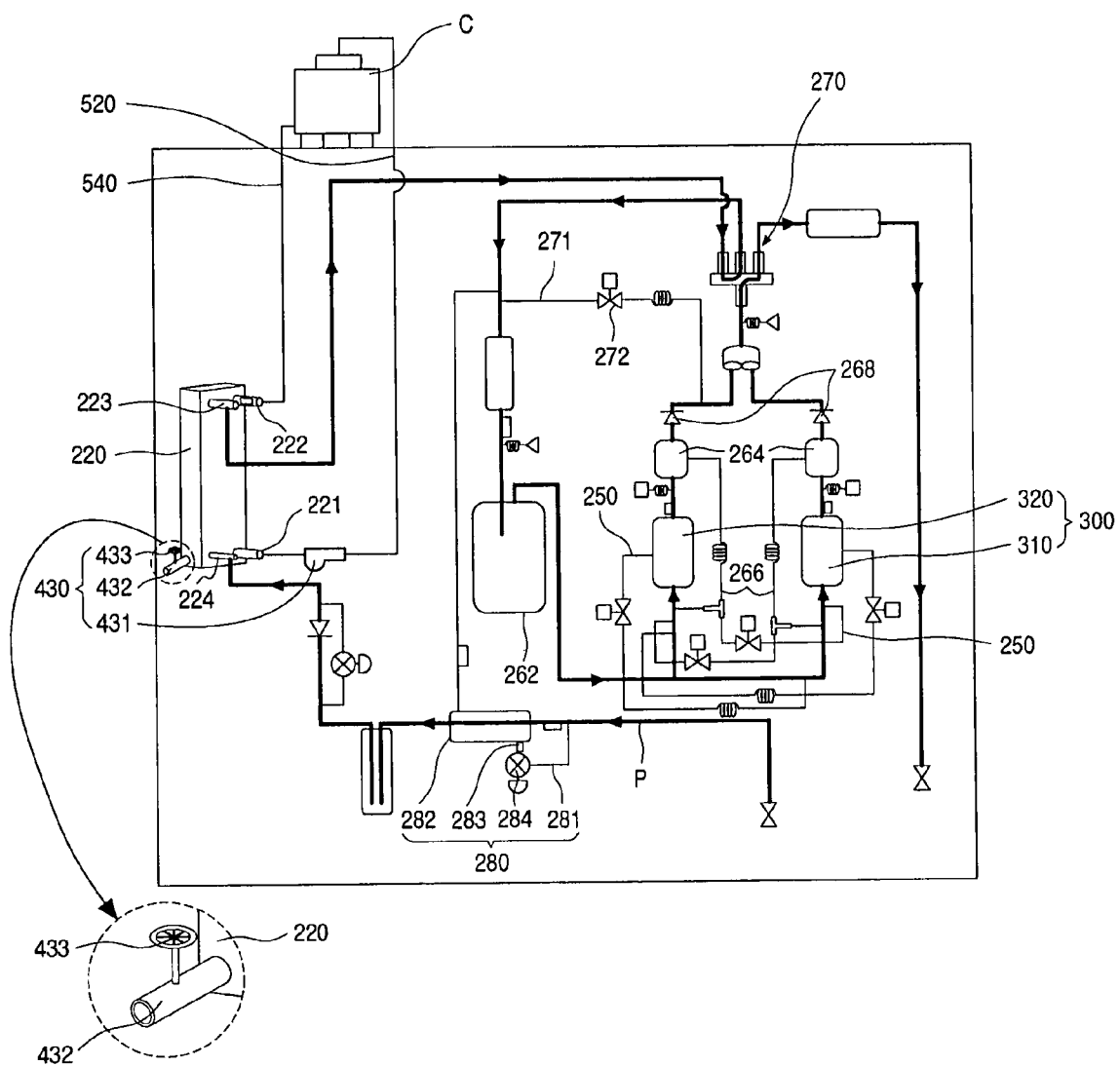
FIG. 8 is a schematic view showing a discharger provided in a water-cooled air conditioner according to the present invention and the flow of refrigerant.

FIG. 8 is a schematic view showing a discharger provided in a water-cooled air conditioner according to the present invention and the flow of refrigerant.

Referring to FIG. 8, a discharger 430 for discharging water is provided inside and outside the second heat exchanger 2210. The discharger 430 is another embodiment of the anti-freezing device described above, and forcefully discharges water that collects within the second heat exchanger 220 to the outside, preventing freezing of water within the second heat exchanger 220.

The discharger 430 includes a discharge pump 431 for forcefully discharging water stored inside the second heat exchanger 220, a drain portion 432 formed to communicate with the inside of the second heat exchanger 220 and being a passage through which water is drained out from the second heat exchanger 220, and a drain valve 433 installed on the drain portion 432 for selectively opening and closing the drain portion 432.

The drain pump 431 is installed to one side of the water supply portion 221 that supplies water to the inside of the second heat exchanger 220, and operates upon the supply of electrical power to forcefully discharge water from the inside of the second heat exchanger 220.

The drain portion 432 allows the water collected inside the second heat exchanger 220 to drain on its own to the outside, and the drain valve 433 is installed on the drain portion 432 to selectively open and close the drain portion 432.

The discharger 430 prevents freezing of the second heat exchanger during a prolonged period of non-operation of the air conditioner during winter and when the temperature inside the second heat exchanger 220 suddenly falls sharply due to other circumstances.

The discharger 430 operates while being connected to the water return temperature sensor 227 (FIG. 11). That is, when the temperature of water within the second heat exchanger 220 falls below 0° C., because the water return temperature sensor 227 (FIG. 11) constantly monitors the temperature, it transmits a signal to the main micom, and the main micom that receives the transferred temperature of the water applies power to the discharger 430.

When power is applied to the discharger 430 by the main micom, the discharger 430 operates. If the situation is one in which a user has not used the air conditioner during winter for an extended duration, even when the outside temperature falls below 0° C., the water within the second heat exchanger 220 is discharged by the discharger 430 to the outside so that water does not freeze within the second heat exchanger 220, preventing damage to the second heat exchanger 220.

The drain valve 433 installed in the drain portion 432 operates according to the temperature of water sensed by the water return temperature sensor 227 (FIG. 11). Specifically, when the temperature of water sensed by the water return temperature sensor while returning from the second heat exchanger 220 falls below 0° C., the water return temperature sensor 227 transmits a signal to the main micom, and the main micom that receives the signal applies power to open the drain valve 433 to naturally drain water remaining within the second heat exchanger 220.

Accordingly, the drain valve 433 that has power applied thereto allowing the drain portion 432 to selectively be opened and closed may be a solenoid valve; and a drain hose (not shown) may be further connected to the end of the drain portion 432 in order to drain water through the drain valve 432 when the drain valve 433 opens the drain portion 432.

A direction controller is further provided at a side of the second heat exchanger 220 to maintain the flow of water and refrigerant through the inside of the second heat exchanger 220 flowing in opposite directions. This direction controller selectively controls the flow direction of at least one of the water or refrigerant. That is, the direction controller includes at least one of a water direction controller that selectively changes the flow direction of water entering the second heat exchanger 220, and a refrigerant direction controller that selectively controls the flow direction of refrigerant entering the second heat exchanger 220.

Figure 9:
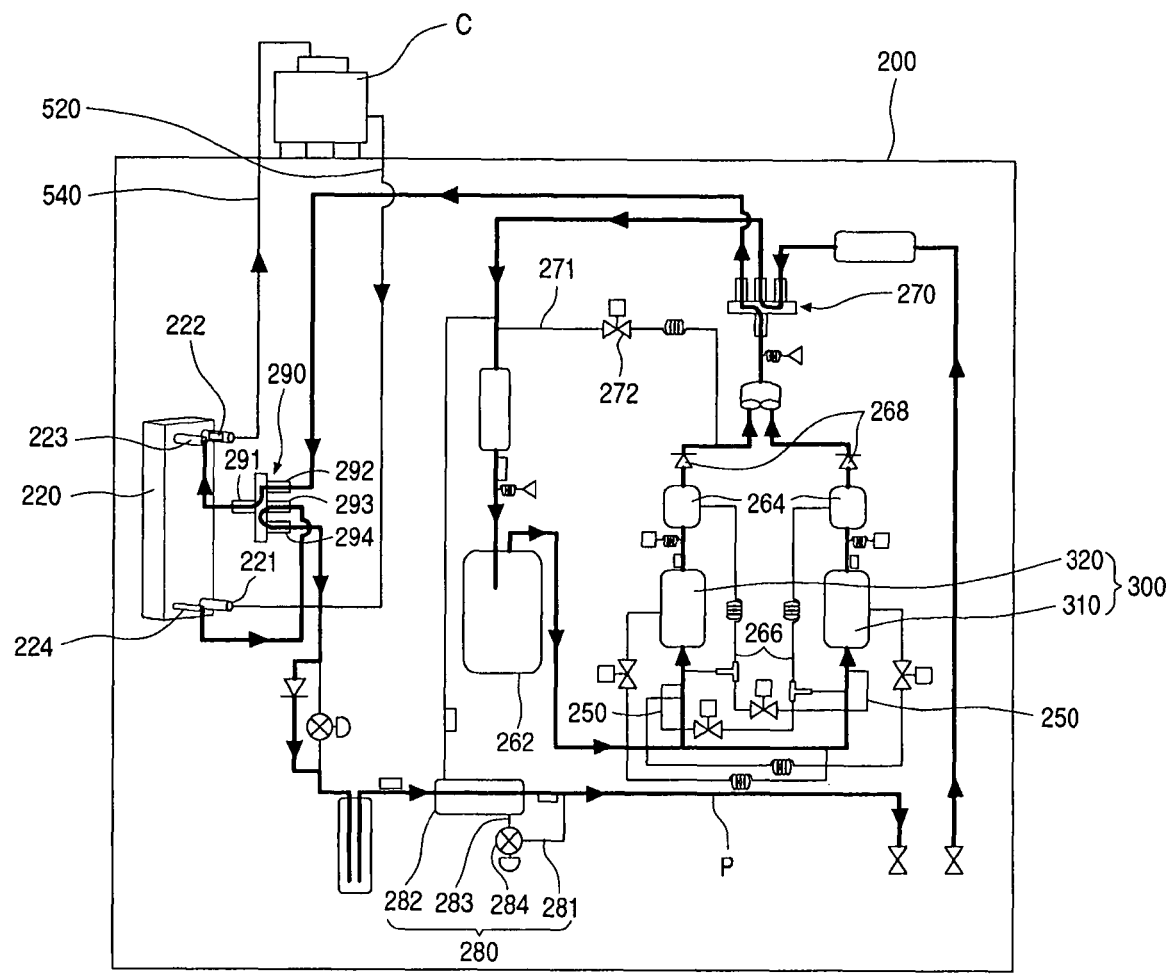
FIG. 9 is a schematic view showing a refrigerant direction controller provided in a water-cooled air conditioner according to the present invention and the flow of refrigerant during cooling operation.
Figure 10:
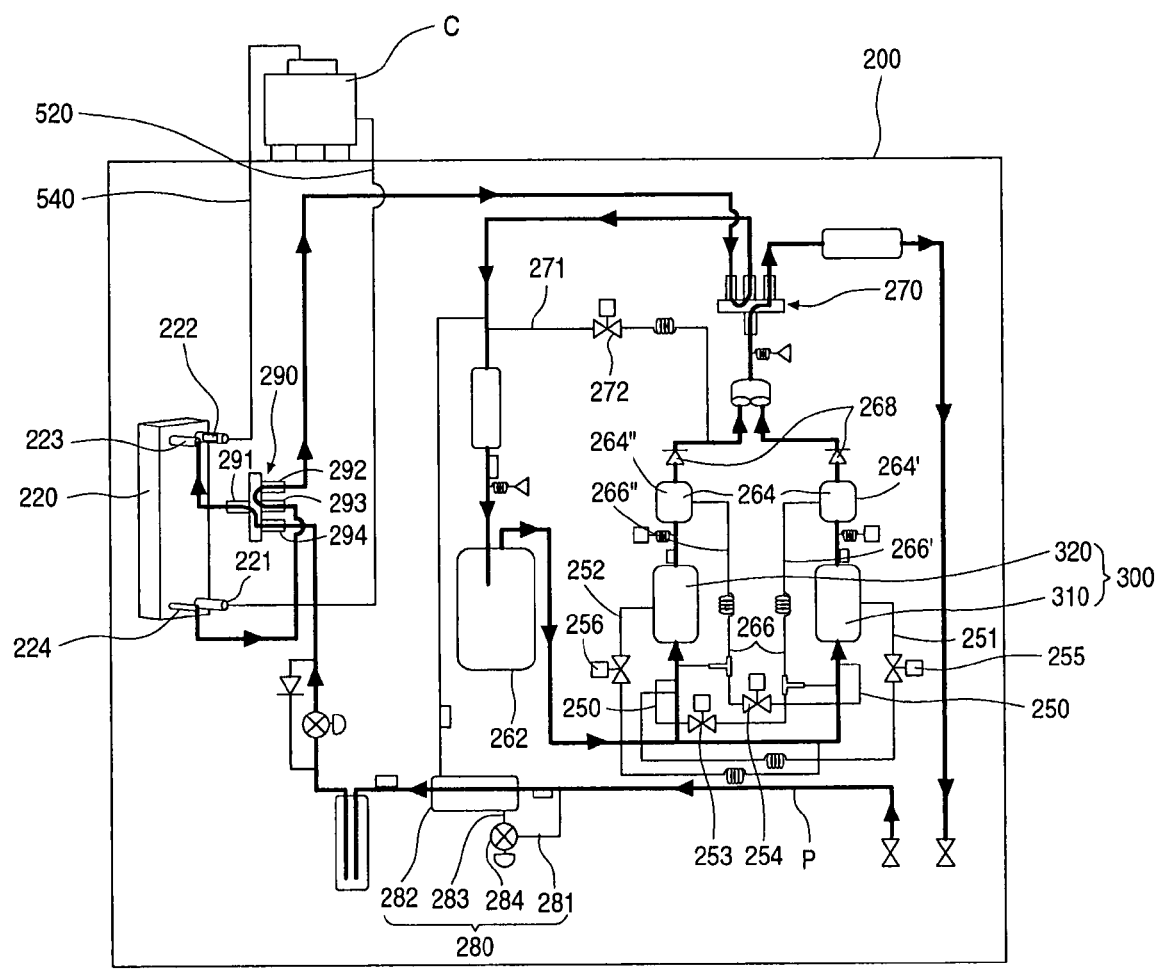
FIG. 10 is a schematic view showing a refrigerant direction controller provided in a water-cooled air conditioner according to the present invention and the flow of refrigerant during heating operation.

FIG. 9 is a schematic view showing a refrigerant direction controller provided in a water-cooled air conditioner according to the present invention and the flow of refrigerant during cooling operation, and FIG. 10 is a schematic view showing a refrigerant direction controller provided in a water-cooled air conditioner according to the present invention and the flow of refrigerant during heating operation.

Referring to FIGS. 9 and 10, a refrigerant direction controller 290 is provided at one side of the second heat exchanger 220. That is, the refrigerant direction controller 290 is installed to communicate with the refrigerant intake port 223 formed at the front of the second heat exchanger 220.

The refrigerant direction controller 290 is a 4-way valve. A first 4-way valve port 291 of the 4-way valve is connected to the refrigerant intake port 223, a second 4-way valve port 292 is connected to a port of the main refrigerant valve 270, and a third 4-way valve port is connected to the refrigerant discharge port 224. Also, a fourth 4-way valve port is connected to the refrigerant discharge pipe (P) connected to the first heat exchanger (not shown).

The direction of refrigerant flowing into the second heat exchanger 220 through the refrigerant direction controller 290 always flows in one direction, and the refrigerant that always flows in one direction through the inside of the second heat exchanger 220 flows in a direction opposite to the direction in which water flows within the second heat exchanger 220.

The refrigerant direction controller 290 is installed to communicate with the refrigerant intake port 223 formed at the front of the second heat exchanger 220, and even when the flow direction of refrigerant is changed according to the operating mode of the air conditioner, the refrigerant direction controller 290 allows the refrigerant to flow in one direction, that is, in a direction through the refrigerant intake port 223 into the second heat exchanger 220.

In other words, when the air conditioner is operating in cooling mode, the refrigerant discharged from the compressor 300 passes through the main refrigerant valve 270 and flows to the second 4-way port 292, and then passes through the first 4-way port 291, through the refrigerant intake port 223, and then flows into the second heat exchanger 220.

On the other hand, when the air conditioner is operating in heating mode, the refrigerant discharged from the compressor 300 passes through the main refrigerant valve 270 and the first heat exchanger (not shown), and then flows to the fourth 4-way port 294 and through the first 4-way port 291 and the refrigerant intake port 223 into the second heat exchanger 220.

Figure 12:
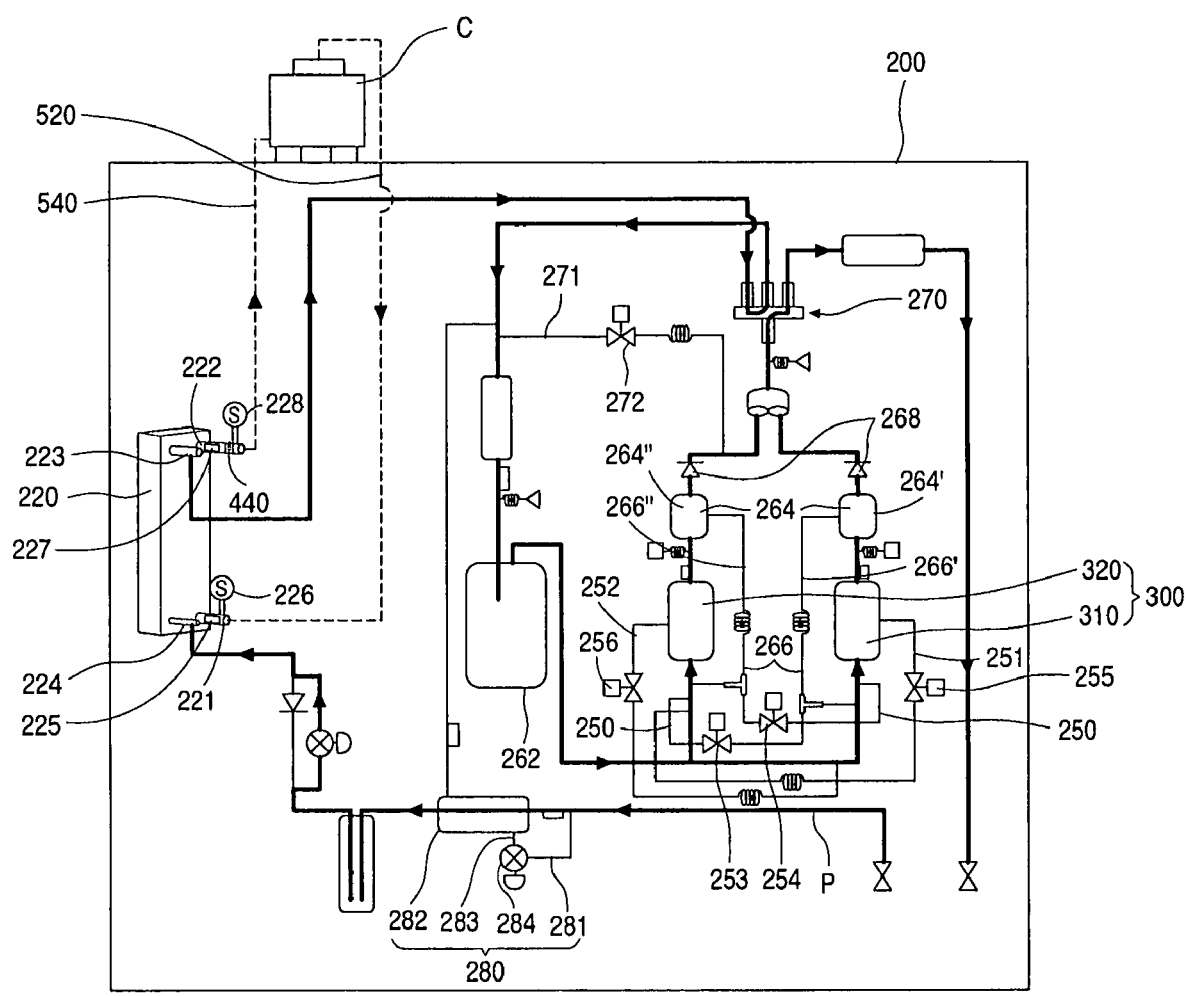
FIG. 12 is a schematic view showing a flow sensor provided in a water-cooled air conditioner according to the present invention and the flow of refrigerant during heating operation.

FIG. 11 is a schematic view showing a flow sensor provided in a water-cooled air conditioner according to the present invention and the flow of refrigerant during cooling operation, and FIG. 12 is a schematic view showing a flow sensor provided in a water-cooled air conditioner according to the present invention and the flow of refrigerant during heating operation.

Referring to FIGS. 11 and 12, a flow sensor 440 is provided at a side of the water supply portion 221 and water return portion 222 that are formed on a surface of the second heat exchanger 220, in order to sense whether water is flowing within the second heat exchanger 220.

The flow sensor 440 may employ a method using pressure differences generated within the second heat exchanger 220 and a floater switch that senses whether water flows by sensing a flow quantity of water; however, the flow sensor 440 may employ other devices or a method using temperatures.

A description of a flow sensor 440 employing differences in pressure will be given.

A water supply temperature sensor 225 sensing the temperature of water supplied into the second heat exchanger 220, and a water supply pressure sensor 226 sensing the pressure of the supplied water are installed on the water supply portion 221. Also, a water return temperature sensor 227 sensing the temperature of water that has exchanged heat with refrigerant within the second heat exchanger 220, and a water return pressure sensor 228 sensing pressure of returned water are installed on the water return portion 222.

Accordingly, the pressure sensed by the water supply pressure sensor 226 and the water return pressure sensor 228, and the temperature sensed by the water supply temperature sensor 225 and the water return temperature sensor 227 are used to sense the flow of water within the second heat exchanger 220.

When pressure data of water sensed by the water supply pressure sensor 226 and the water return pressure sensor 228 is transmitted to the main micom (not shown), the main micom that receives the pressure data of water subtracts and compares the received pressure data of the water with a preset pressure difference.

The main micom that receives pressure data of water sensed by the water supply pressure sensor 226 and the water return pressure sensor 228 balances the two pressure data. In other words, the pressure data of water sensed by the water return pressure sensor 228 is subtracted from the pressure data of water sensed by the water supply pressure sensor 226.

Here, the subtracted value of the pressure data is compared to a preset pressure difference, and the operation of the compressor 300 is selectively stopped.

In further detail, while the air conditioner is operating in cooling mode, when the difference between the pressure data sensed by the water supply pressure sensor 226 and the water return pressure sensor 228 is 20 kPa or above, it is determined that a large amount of impurities are deposited within the second heat exchanger 220.

Also, while the air conditioner is operating in heating mode, when the difference between the pressure data sensed by the water supply pressure sensor 226 and the water return pressure sensor 228 is 20 kPa or above, it is determined that water within the second heat exchanger 220 is frozen, and main micom stops the operation of the compressor 300.

Also, while not shown in the diagrams, the main micom may employ a separate display or buzzer to issue a signal alerting a user that flow of water within the second heat exchanger 220 is restricted.

Conversely, while the air conditioner is operating in cooling or heating modes, when the difference between the pressure data sensed by the water supply pressure sensor 226 and the water return pressure sensor 228 is below 20 kPa, it is determined that flow of water is not restricted, and the main micom applies power to and operates the compressor 300 to enable normal operation of the air conditioner.

Figure 13:
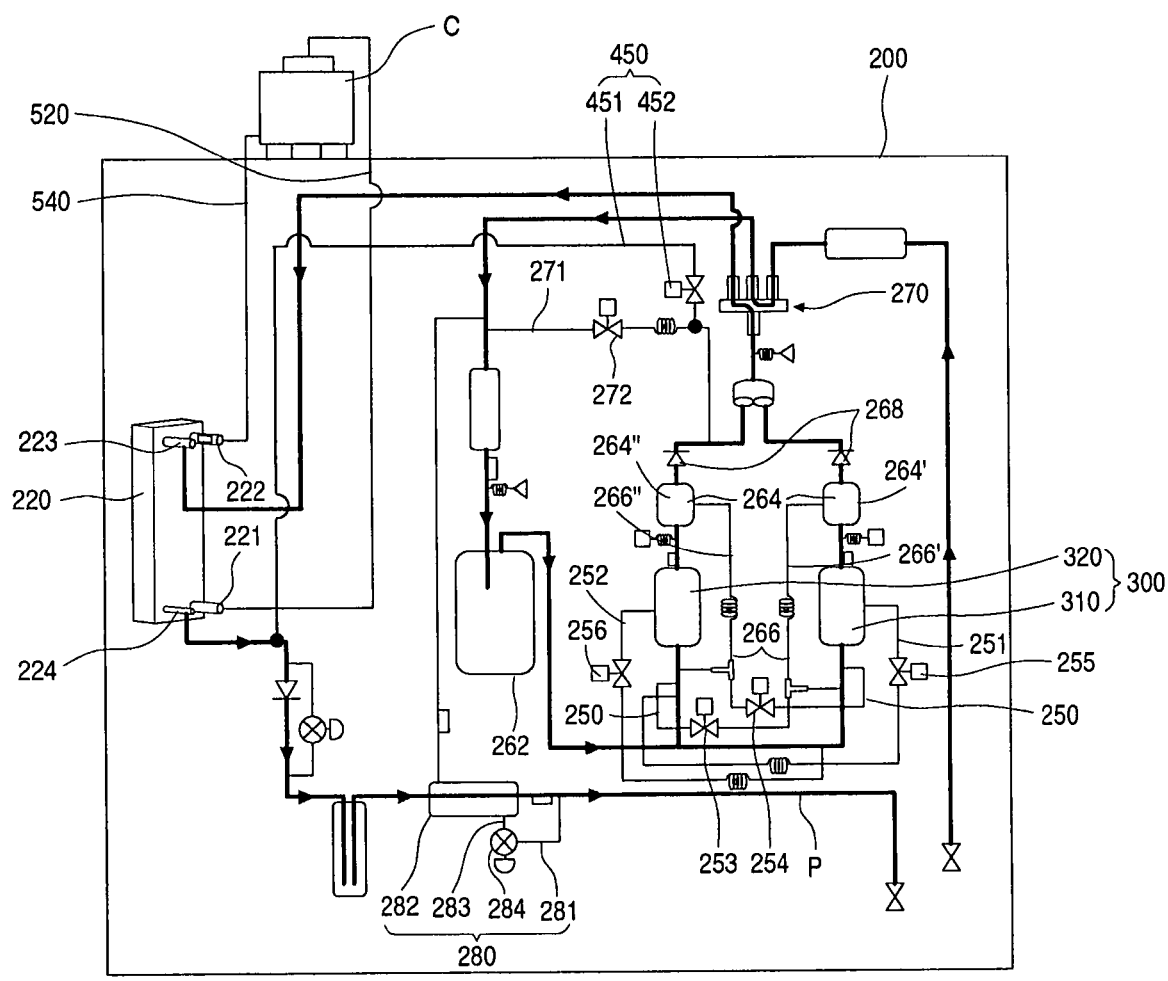
FIG. 13 is a schematic view showing a refrigerant bypass unit provided in a water-cooled air conditioner according to the present invention and the flow of refrigerant during cooling operation.
Figure 14:
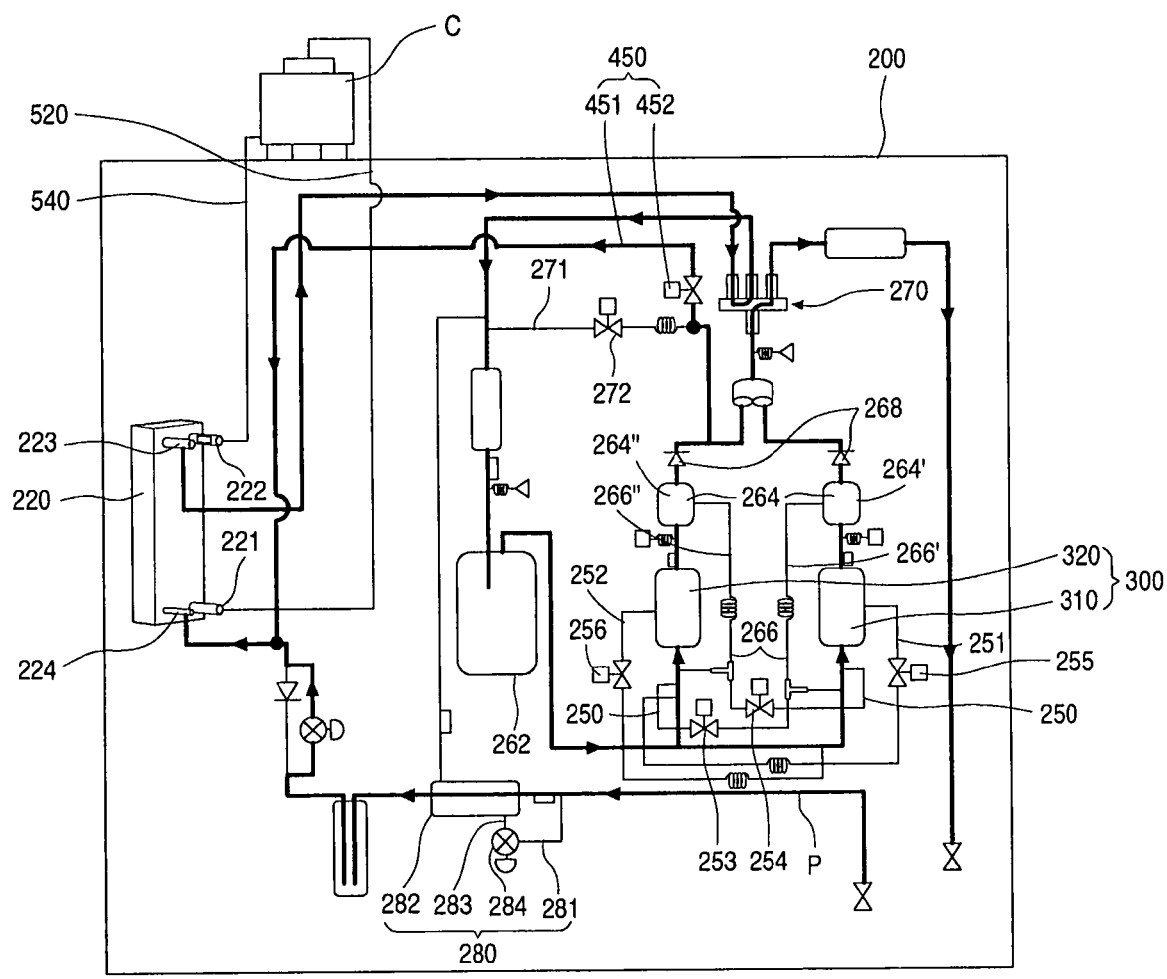
FIG. 14 is a schematic view showing a refrigerant bypass unit provided in a water-cooled air conditioner according to the present invention and the flow of refrigerant during heating operation when the refrigerant bypass unit is not used.

FIG. 13 is a schematic view showing a refrigerant bypass unit provided in a water-cooled air conditioner according to the present invention and the flow of refrigerant during cooling operation, and FIG. 14 is a schematic view showing a refrigerant bypass unit provided in a water-cooled air conditioner according to the present invention and the flow of refrigerant during heating operation when the refrigerant bypass unit is not used. Also, FIG. 15 is a schematic view showing a refrigerant bypass unit provided in a water-cooled air conditioner according to the present invention and the flow of refrigerant during heating operation when the refrigerant bypass unit is used.

Figure 15:
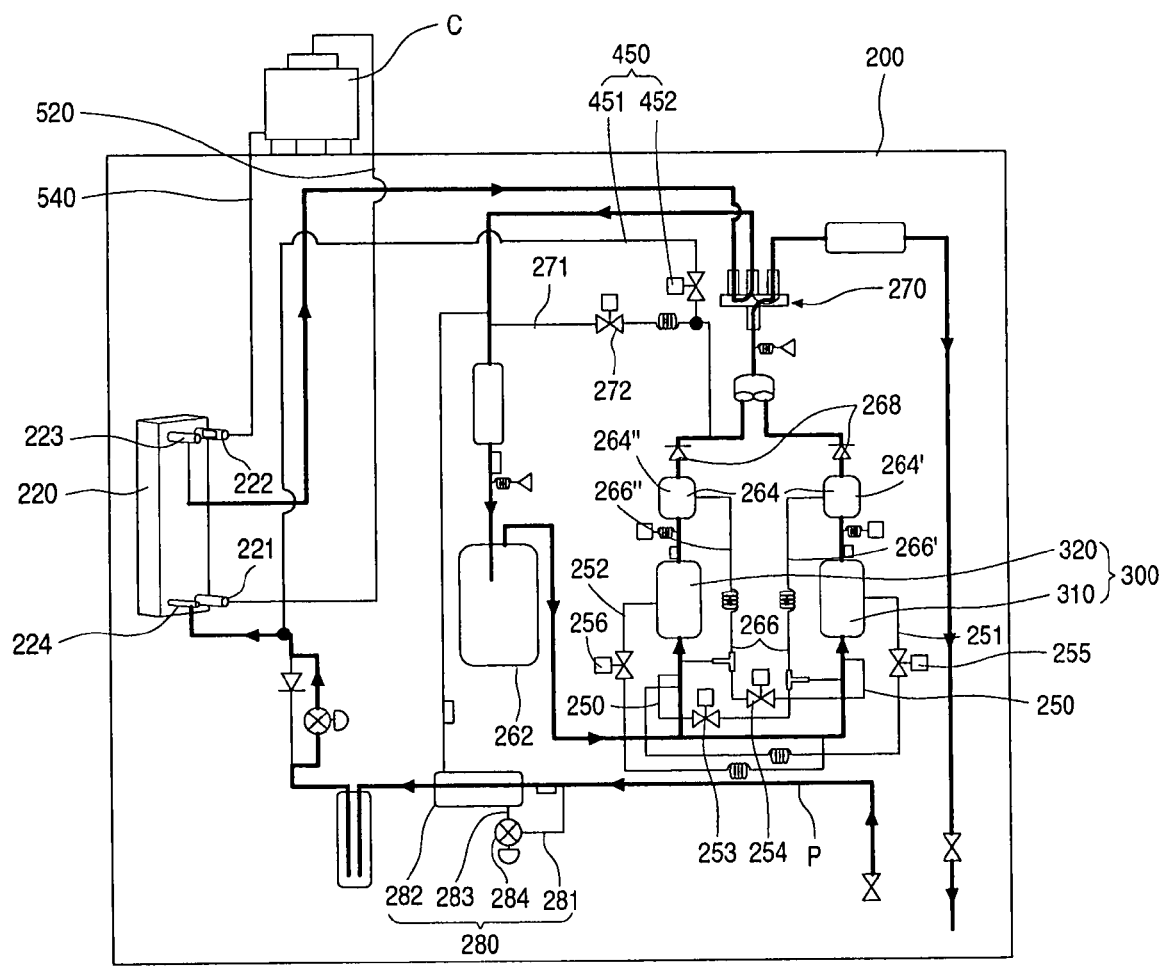
FIG. 15 is a schematic view showing a refrigerant bypass unit provided in a water-cooled air conditioner according to the present invention and the flow of refrigerant during heating operation when the refrigerant bypass unit is used.

Referring to FIGS. 13 through 15, a refrigerant bypass unit 450 is further installed on the outdoor unit 200. That is, a refrigerant bypass unit 450 (FIG. 13) for supplying a portion of compressed refrigerant from the compressor 300 into the second heat exchanger 220 and prevent freezing of water flowing into the second heat exchanger 220. The refrigerant bypass unit 450 is an alternate embodiment to the anti-freezing device described above.

The refrigerant bypass unit 450 guides refrigerant compressed by the compressor 300 to a high temperature and pressure into the second heat exchanger 220 in order to prevent freezing within the second heat exchanger 220 by passing the refrigerant through the second heat exchanger 220.

For this purpose, the refrigerant bypass unit 450 includes a refrigerant bypass pipe 451 with one end communicating with the lower portion of the second heat exchanger 220 and the other end installed to communicate with the discharge end of the compressor 300, and a bypass valve 452 installed on the refrigerant bypass pipe 451 for selectively opening and closing the inside of the refrigerant bypass pipe 451.

The refrigerant bypass pipe 451 is provided to guide refrigerant discharged from the compressor 300 into the second heat exchanger 220, and has one end formed to communicate with the hot gas pipe 271 and the other end formed to communicate with a side of the refrigerant pipes (P) connected to the refrigerant discharge port 224.

Accordingly, while the air conditioner is operating in cooling mode, a portion of refrigerant discharged from the compressor 300 flows through the main refrigerant valve 270 into the first heat exchanger (not shown), and another portion of refrigerant flows to the hot gas pipe 271. A portion of the refrigerant that flows to the hot gas pipe 271 flows through the refrigerant bypass pipe 451 formed to communicate with a side of the hot gas pipe 271 and through the refrigerant discharge port 224 into the second heat exchanger 220.

Here, the location of the connection communicating the end of the refrigerant bypass pipe 451 with the hot gas pipe 271 is between the hot gas valve 272 and the discharging side of the compressor 300. This is so that refrigerant discharged from the compressor 300 can flow to the refrigerant bypass pipe 451, regardless of whether the hot gas valve 272 is open or closed.

A bypass pipe valve 452 is installed on the refrigerant bypass pipe 451, and is configured to operate in connection with the water return temperature sensor 227. That is, the water return temperature sensor continuously senses the temperature of water flowing within the water return portion 222; and when the sensed temperature of the water falls below 0° C., the water return temperature sensor 227 generates a signal and sends the signal to the main micom, so that the main micom that receives the signal opens the bypass pipe valve 452.

Accordingly, water that flows within the second heat exchanger 220 is prevented from freezing when the air conditioner is not used for a long period during winter or the outdoor temperature falls below 0° C.

Below, a description of a liquid refrigerant discharger 273 (FIG. 16), for lowering the temperature of refrigerant flowing into the accumulator 262 of a water-cooled air conditioner according to the present invention, will be given.

Figure 16:
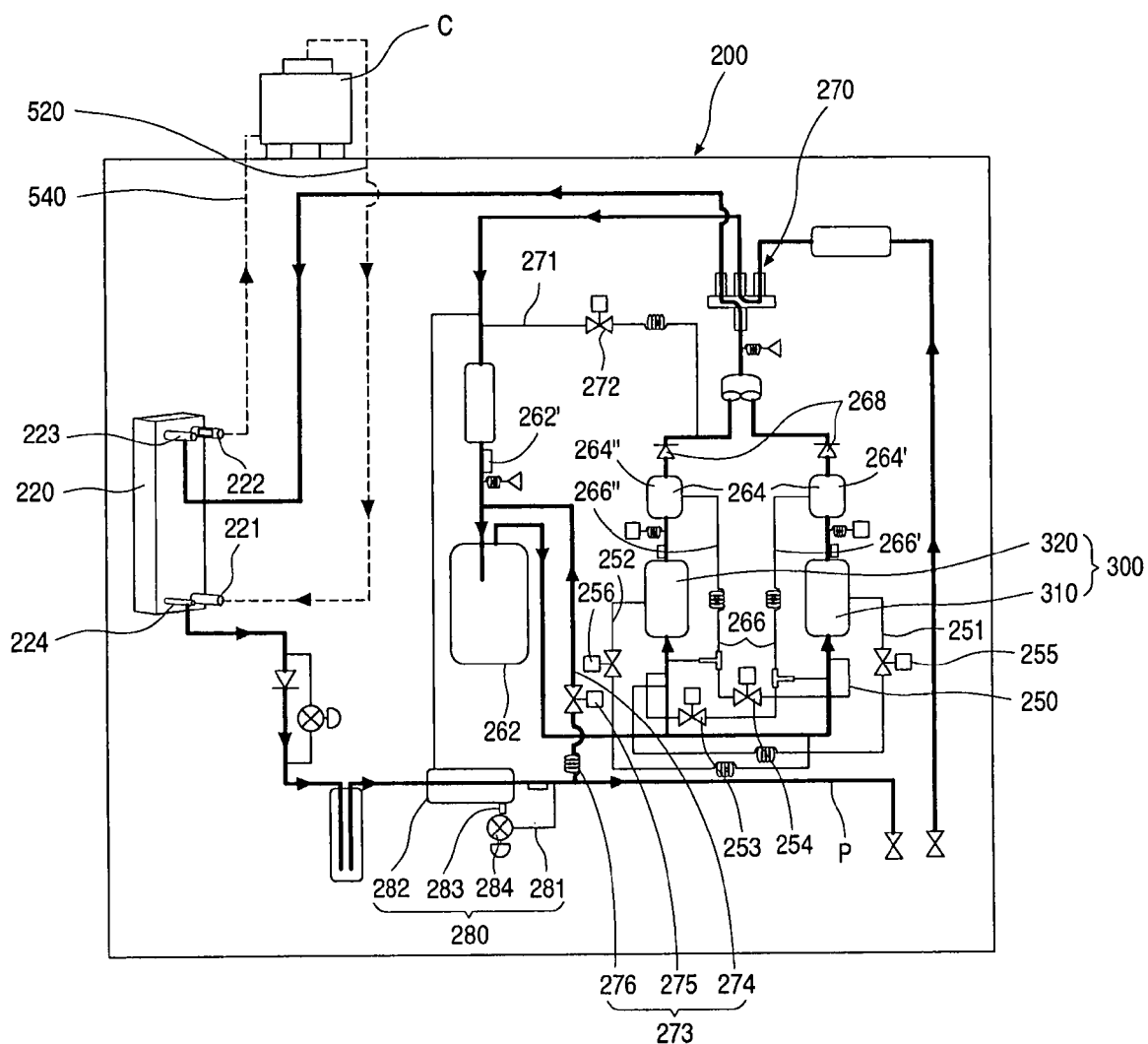
FIG. 16 is a schematic view showing a liquid refrigerant discharger provided in a water-cooled air conditioner according to the present invention and the flow of refrigerant during cooling operation when the liquid refrigerant discharger is used.
Figure 17:
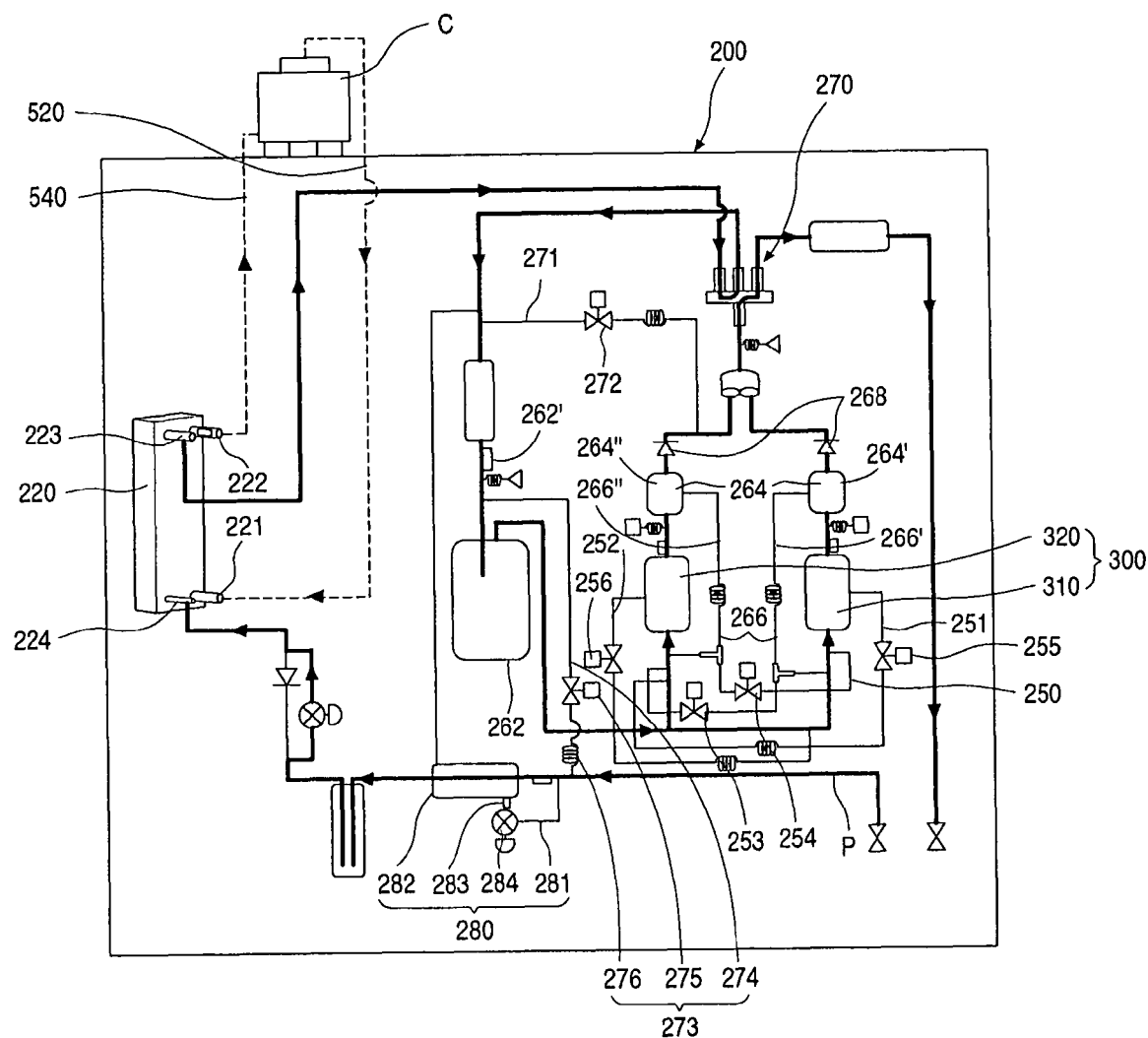
FIG. 17 is a schematic view showing a liquid refrigerant discharger provided in a water-cooled air conditioner according to the present invention and the flow of refrigerant during heating operation when the liquid refrigerant discharger is not used.

FIG. 16 is a schematic view showing a liquid refrigerant discharger provided in a water-cooled air conditioner according to the present invention and the flow of refrigerant during cooling operation when the liquid refrigerant discharger is used, and FIG. 17 is a schematic view showing a liquid refrigerant discharger provided in a water-cooled air conditioner according to the present invention and the flow of refrigerant during heating operation when the liquid refrigerant discharger is not used.

Referring to FIGS. 16 and 17, when hot refrigerant flows into a high pressure scroll compressor employed by a water-cooled air conditioner according to the present invention, in order to prevent cessation of and damage to the compressor, a liquid refrigerant discharger 273 is provided to cool refrigerant flowing into the accumulator 262.

Specifically, the liquid refrigerant discharger 273 guides a portion of refrigerant that has exchanged heat with water within the second heat exchanger 220 to the accumulator 262, and operates according to a temperature of refrigerant sensed by an accumulator sensor 262' installed at the entrance of the accumulator 262. In further detail, one end of the liquid refrigerant discharger 273 is formed to communicate with the intake side of the accumulator 262, and the other end is formed to communicate with the discharging end of the second heat exchanger 220. The liquid refrigerant discharger 273 includes a liquid refrigerant discharging pipe 274 that guides the flow of refrigerant, a discharging pipe valve 275 installed on the liquid refrigerant discharging pipe 274 to selectively open and close the liquid refrigerant discharging pipe 274, and a capillary tube 276 formed at one side of the liquid refrigerant discharging pipe 274 to raise the temperature and pressure of refrigerant flowing into the liquid refrigerant discharging pipe 274.

Furthermore, when the temperature of refrigerant sensed by the accumulator sensor 262' exceeds a preset temperature, the discharging pipe valve 275 operates to open the liquid refrigerant discharging pipe 274. When the temperature of refrigerant sensed by the accumulator sensor 262' is transmitted to the main micom, the main micom that receives the temperature of the refrigerant applies power to the discharging pipe valve 275. The discharging pipe valve 275, to which power is applied, operates to open the liquid refrigerant discharging pipe 274.

Accordingly, when the air conditioner is operating in cooling mode, the discharging pipe valve 275 operates to close the liquid refrigerant discharging pipe 274; and when the air conditioner is operating in heating mode, the discharging pipe valve 275 operates to open the liquid refrigerant discharging pipe 274.

A capillary tube 276 is provided at one end of the liquid refrigerant discharging pipe 274. That is, the capillary tube 276 has its lower end formed to communicate with the refrigerant pipes (P) connected between the second heat exchanger 220 and the first heat exchanger (not shown), and has its other end formed to communicate with one end of the liquid refrigerant discharging pipe 274.

The inner circumference of the capillary tube 276 is formed as a narrow, spiral passage, so that when the discharging pipe valve 275 is opened, refrigerant flows therein. When refrigerant that has exchanged heat with water inside the second heat exchanger 220 flows to the accumulator 274, the capillary tube 276 changes the refrigerant to a state of low temperature and pressure.

The liquid refrigerant that has been changed to a state of low temperature and pressure while passing through the capillary tube 276 is guided by the liquid refrigerant discharging pipe 274 to the entrance of the accumulator 262. The refrigerant that flows to the entrance of the accumulator 262 passes the second heat exchanger 220 and mixes with refrigerant that has exchanged heat with water, and flows inside the accumulator 262.

The refrigerant that flows through the capillary tube 276 becomes cooler in temperature than the refrigerant that passes through the second heat exchanger 220 to exchange heat with water therein. Because refrigerant that enters the inside of the accumulator 262 is lower in temperature than refrigerant that flows through the inside of the accumulator 262 without passing through the capillary tube 276, the refrigerant is made to pass through the capillary tube 276.

That is, as refrigerant that has exchanged heat with water inside the second heat exchanger 220 mixes with low temperature refrigerant that passes through the capillary tube 276, the refrigerant that is cooler than the refrigerant that has exchanged heat within the second heat exchanger 220 flows into the accumulator 262 and enters the inside of the compressor 300.

Thus, low temperature refrigerant flows through the inside of the accumulator 262 into the compressor 300, so that low temperature refrigerant flows into the compressor 300, thereby preventing damage and stoppage of the compressor 300.

Below, an oil restoring pipe 250 provided in a water-cooled air conditioner according to the present invention will be described.

The oil restoring pipe 250 includes: a constant speed oil recovery pipe 266', for recovering oil from a constant speed oil separator 264' that separates oil included in refrigerant discharged from the constant speed compressor 310, and guiding the recovered oil to the constant speed compressor 310 and the inverter compressor 320; an inverter oil recovery pipe 266", for recovering oil from an inverter oil separator 264" that separates oil included in refrigerant discharged from the inverter compressor 320, and guiding the recovered oil to the constant speed compressor 310 and the inverter compressor 320; a constant speed oil restoring pipe 251 that guides the flow of oil overflowing from the constant speed compressor 310 to the inverter compressor 320; and an inverter oil restoring pipe 252 that guides the flow of oil overflowing from the inverter compressor 320 to the constant speed compressor 310.

Also, a constant speed recovery valve 253, for selectively opening and closing the inside of the constant speed oil recovery pipe 266', is formed on the pipe communicating the constant speed oil recovery pipe 266' with the inverter compressor 320; and an inverter recovery valve 254, for selectively opening and closing the inside of the inverter oil recovery pipe 266", is formed on the pipe communicating the inverter oil recovery pipe 266" with the constant speed compressor 310.

Furthermore, a constant speed oil restoring valve 255 for selectively opening and closing the constant speed oil restoring pipe 251 is installed on the constant speed oil restoring pipe 251, and an inverter oil restoring valve 256 for selectively opening and closing the inverter oil restoring pipe 252 is installed on the inverter oil restoring pipe 252.

That is, the end of the constant speed oil recovery pipe 266', that recovers oil from the constant speed oil separator 264' to the constant speed compressor 310, is branched so that one discharging pipe communicates with the entrance of the constant speed compressor 310, and the other discharging pipe communicates with the entrance of the inverter compressor 320.

The end of the inverter oil recovery pipe 266", that recovers oil from the inverter oil separator 264" to the inverter compressor 320, is branched so that one discharging pipe communicates with the entrance of the inverter compressor 320, and the other discharging pipe communicates with the entrance of the constant speed compressor 310.

The constant speed oil restoring pipe 251 that guides the oil that overflows from the constant speed compressor 310 to flow into the inverter compressor 320 is formed to communicate at one end thereof with a side of the constant speed compressor 310, and has the other end thereof formed to communicate with the entrance of the inverter compressor 320. A constant speed oil restoring valve 255 is installed on the constant speed oil restoring pipe 251 to selectively open and close the constant speed oil restoring pipe 251.

The inverter oil restoring pipe 252 that guides the oil that overflows from the inverter compressor 320 to flow into the constant speed compressor 310 is formed to communicate at one end thereof with a side of the inverter compressor 320, and has the other end thereof formed to communicate with the entrance of the constant speed compressor 310. An inverter oil restoring valve 256 is installed on the inverter oil restoring pipe 252 to selectively open and close the inverter oil restoring pipe 252.

When only the inverter compressor 320 operates, the flow of oil is as follows. When the inverter compressor 320 operates so that refrigerant including oil is discharged from the inverter compressor 320, the oil is separated in the inverter oil separator 264", and the oil separated in the inverter oil separator 264" is guided by the inverter oil recovery pipe 266", to flow into the constant speed compressor 310 and the inverter compressor 320, respectively.

Here, the inverter recovery valve 254 that is installed to branch from the inverter oil recovery pipe 266" to communicate with the entrance of the constant speed compressor 310 closes its discharge pipe. That is, the oil flowing through the inverter oil recovery pipe 266" is guided toward the inverter compressor 320.

When only the constant speed compressor 310 is operating, the flow of oil is as follows. When the constant speed % compressor 310 operates so that refrigerant including oil is discharged from the constant speed compressor 310, the oil is separated in the constant speed oil separator 264', and the oil separated in the constant speed oil separator 264' is guided by the constant speed oil recovery pipe 266' to flow into the constant speed compressor 310 and the inverter compressor 320, respectively.

Here, the constant speed recovery valve 253 that is installed to branch from the constant speed oil recovery pipe 266' to communicate with the entrance of the inverter compressor 320 closes its discharge pipe. That is, the oil flowing through the constant speed oil recovery pipe 266' is guided toward the constant speed compressor 310.

On the other hand, when the constant speed compressor 310 and the inverter compressor 320 operate simultaneously, the quantity of oil that flows into each of the compressors 300 is controlled according to the compression loads on the constant speed compressor 310 and the inverter compressor 320, respectively.

Also, the constant speed oil restoring pipe 251 connected to the side of the constant speed compressor 310 has its other end formed to communicate with the entrance of the inverter compressor 320. The constant speed oil restoring valve 255 is installed on the constant speed oil restoring pipe 251. The inverter oil restoring pipe 252 connected to the side of the inverter compressor 320 has its other end formed to communicate with the entrance of the constant speed compressor 310, and is formed to communicate with the entrance of the inverter oil restoring pipe 251.

Accordingly, when there is an insufficient amount of oil in the constant speed compressor 310, the oil from the inverter compressor 320 is guided by the inverter oil restoring pipe 252 to flow to the constant speed compressor 310. Here, the inverter oil restoring valve 256 installed on the inverter oil restoring pipe 252 opens the inverter oil restoring pipe 252, and the constant speed oil restoring valve 255 installed on the constant speed oil restoring pipe 251 closes the constant speed oil restoring pipe 251.

Also, the constant speed recovery valve 253 installed on the constant speed oil recovery pipe 266' closes the constant speed oil recovery pipe 266' so that oil separated by the constant speed oil separator 264' is restored to the constant speed compressor 310, and the inverter restoring valve 254 installed on the inverter oil restoring pipe 266" opens the inverter oil restoring pipe 266" so that a portion of the oil separated by the inverter oil separator 264" flows into the constant speed compressor 310.

Conversely, when there is an insufficient amount of oil in the inverter compressor 320, opposite process restores oil into the inverter compressor 320. That is, the inverter oil restoring valve 256 closes the inverter oil restoring pipe 252, and the constant speed oil recovery pipe 266". Here, the inverter recovery valve 254 operates to close the inverter oil recovery pipe 266".

When the above is performed repeatedly, oil can be made to flow quicker into each compressor 300, and oil can selectively be supplied to each compressor 300 according to its required level of oil, so that damage incurred to the compressors due to a lack of oil can be prevented.

The water-cooled air conditioner according to the present invention is provided with a water flow controller 460 (FIGS.

18 and 19) for controlling the amount of water flowing through the inside of the second heat exchanger 220.

Figure 18:
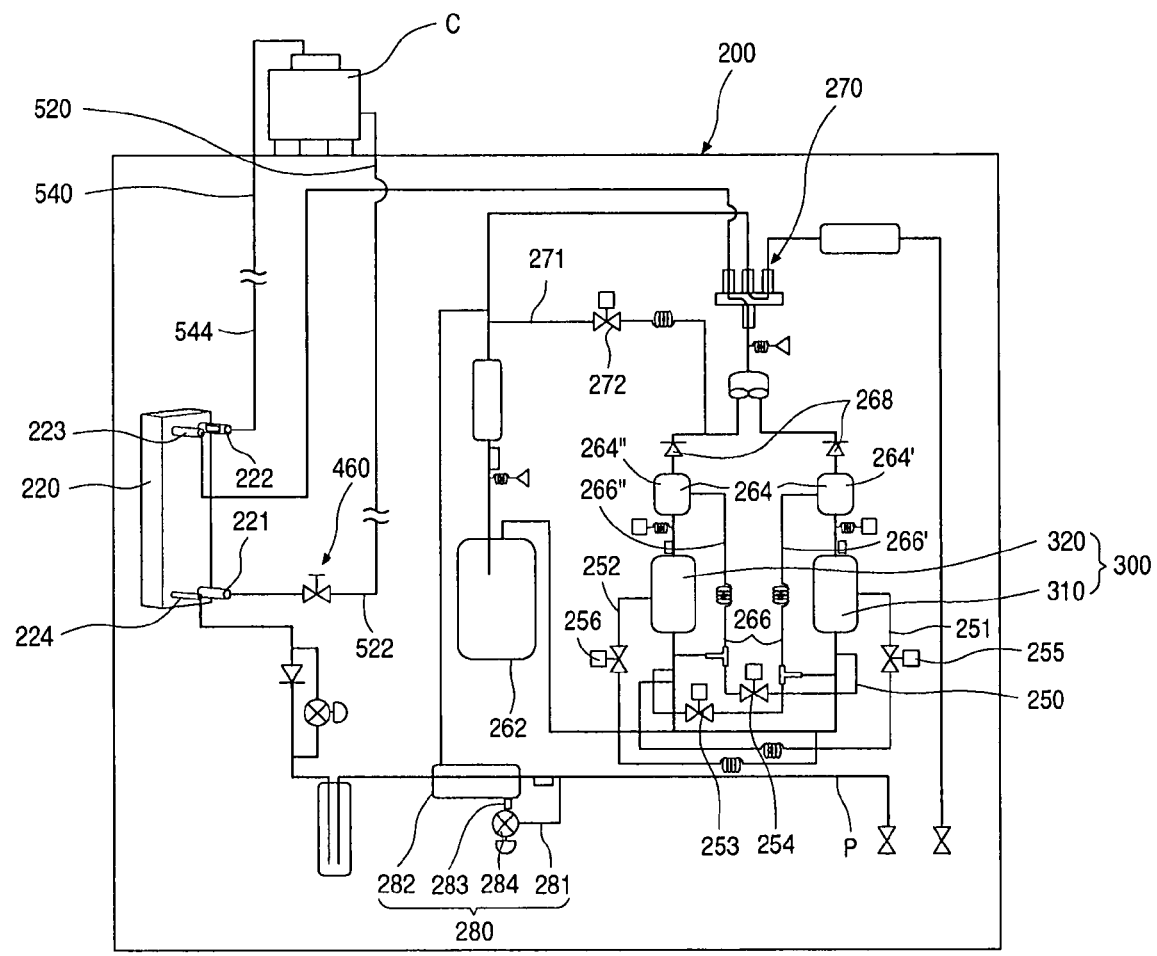
FIG. 18 is a schematic view showing a flow quantity controller of a water-cooled air conditioner according to the present invention.
Figure 19:
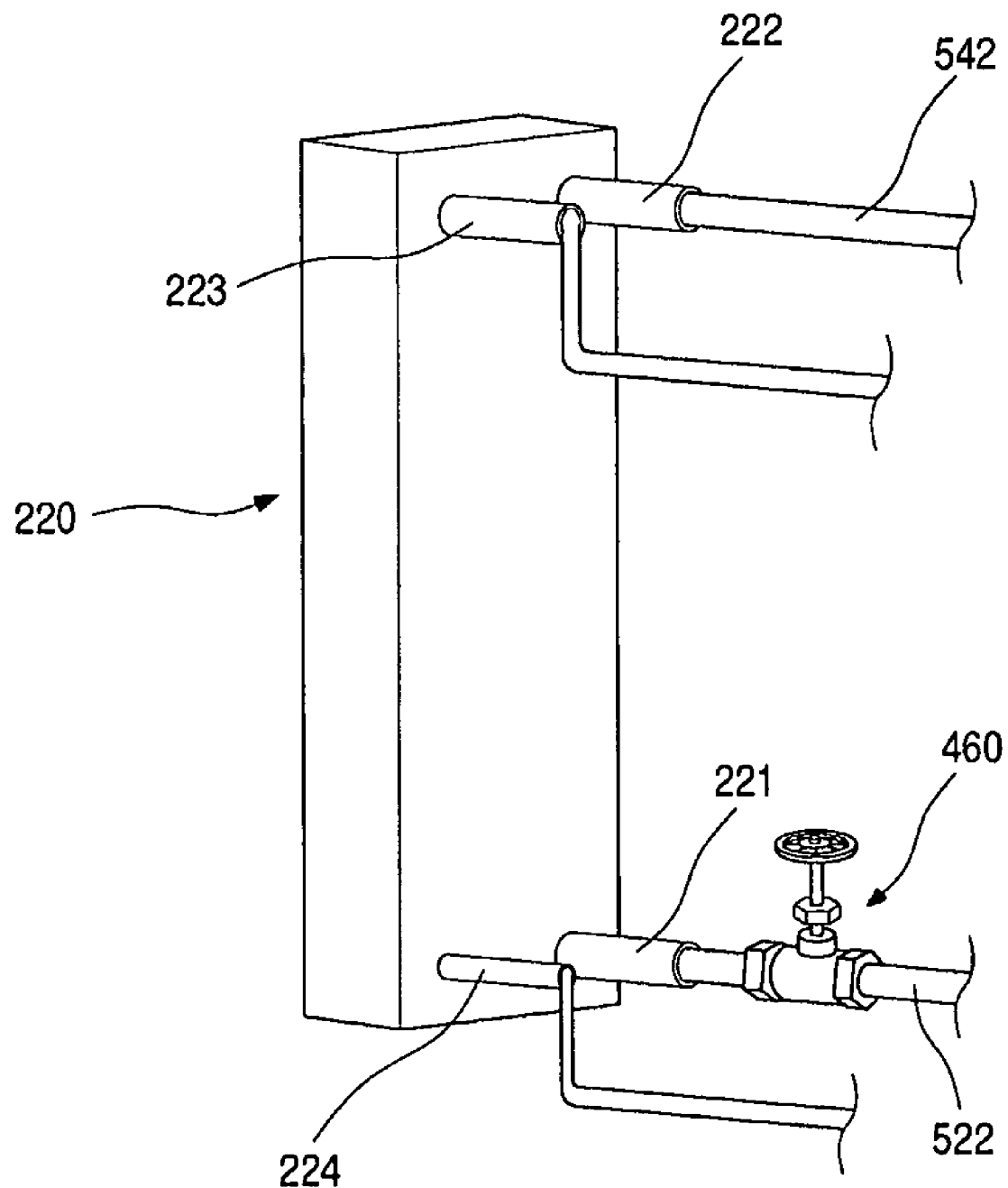
FIG. 19 is a perspective view of a second heat exchanger of a water-cooled air conditioner according to the present invention.

FIG. 18 is a schematic view showing a flow quantity controller of a water-cooled air conditioner according to the present invention, and FIG. 19 is a perspective view of a second heat exchanger of a water-cooled air conditioner according to the present invention.

The water flow controller 460 is provided on the water supply portion 221 formed on one side of the second heat exchanger 220, for controlling the quantity of water flowing through the inside of the second heat exchanger 220.

The amount of heat exchanged by the refrigerant within the second heat exchanger 220 can be controlled according to the amount of water supplied within the second heat exchanger 220 by the water flow controller 460. That is, by controlling the quantity of water supplied within the second heat exchanger 220, the amount by which refrigerant exchanges heat within the second heat exchanger 220 can be controlled according to the load of the indoor space (B) (FIG. 1) in which the first heat exchanger (not shown) is installed.

In other words, when a larger quantity of air conditioning is required by the indoor space (B) (under cooling conditions, for example), the water flow controller 460 allows a larger quantity of water to flow into the second heat exchanger 220, so that a larger quantity of refrigerant and water within the second heat exchanger 220 exchange heat to cool the refrigerant further.

As shown in FIG. 19, the water flow controller 460 is formed as a valve or other device.

The water flow controller 460 may be installed on an end of the water supply branch pipe 522 formed on the second heat exchanger 220 and fixed to communicate with the water supply portion 221. That is, it may be installed between the water supply portion 221 and the water supply branch pipe 522.

This water supply controller 460 formed as a valve controls the degree by which the valve opens according to a signal, so that the quantity of water flowing through the water supply branch pipe 522 may be controlled. Thus, the water supply controller 460 controls the quantity of water supplied into the second heat exchanger 220, thereby controlling the degree of heat exchange that occurs between water and refrigerant within the second heat exchanger 220.

A water supply temperature sensor 225 (FIG. 11) is installed on the water supply portion 221, for sensing the temperature of water supplied into the second heat exchanger 220. The quantity of water supplied is controlled according to the temperature of water sensed by the water supply temperature sensor 225 and the requirements of the indoor space (B).

That is, when the air conditioner is operating in cooling mode and the load of the indoor space (B) (FIG. 1) is reduced by 50%, the flow quantity (supply quantity) of water flowing into the second heat exchanger 220 is reduced to 50% to control the amount of heat exchange that occurs between the water and refrigerant. In this way, the quantity of water supplied into the second heat exchanger 220 is controlled to be suitable to the load imposed by the indoor space (B).

In further detail, assuming the quantity of water supplied from the cooling tower (C) is 100 l when the air conditioner is operating in cooling mode and a user has set the desired temperature of the indoor space (B) to 10° C., when the user sets the desired temperature of the indoor space (B) to 20° C. and the amount of water supplied is 50 l, the indoor space (B) can be maintained at a temperature of 20° C.

Assuming the quantity of water supplied from the cooling tower (C) is 100 l when the air conditioner is operating in heating mode and a user has set the desired temperature of the indoor space (B) to 20° C., when the user sets the desired temperature of the indoor space (B) to 10° C., the optimum amount of water supplied to meet the required load is 50 l.

Below, an alternate embodiment of an overcooler 280 provided in a water-cooled air conditioner according to the present invention will be described.

Figure 20:
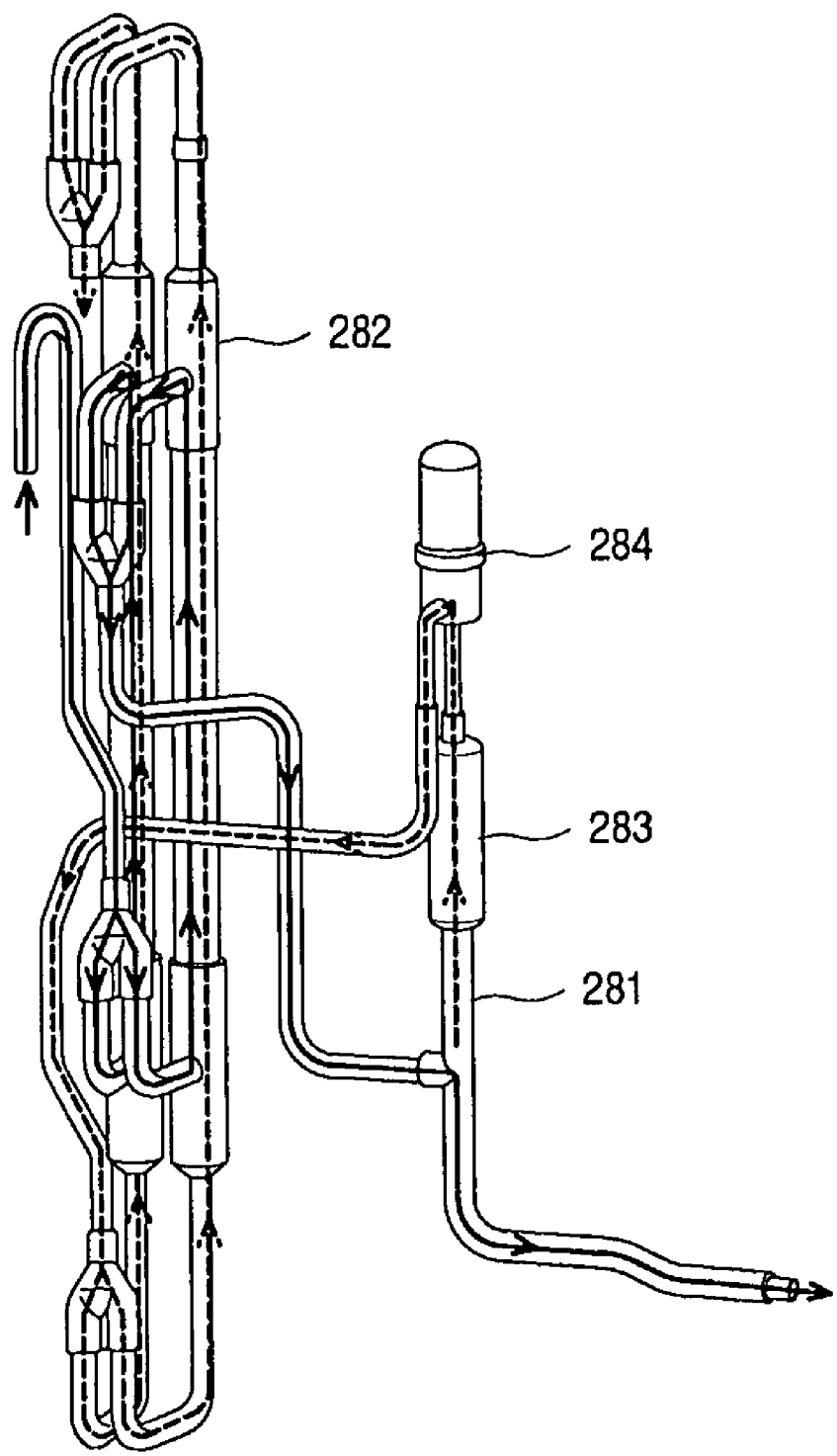
FIG. 20 is a perspective view of an overcooler of a water-cooled air conditioner according to another embodiment of the present invention.
Figure 21:
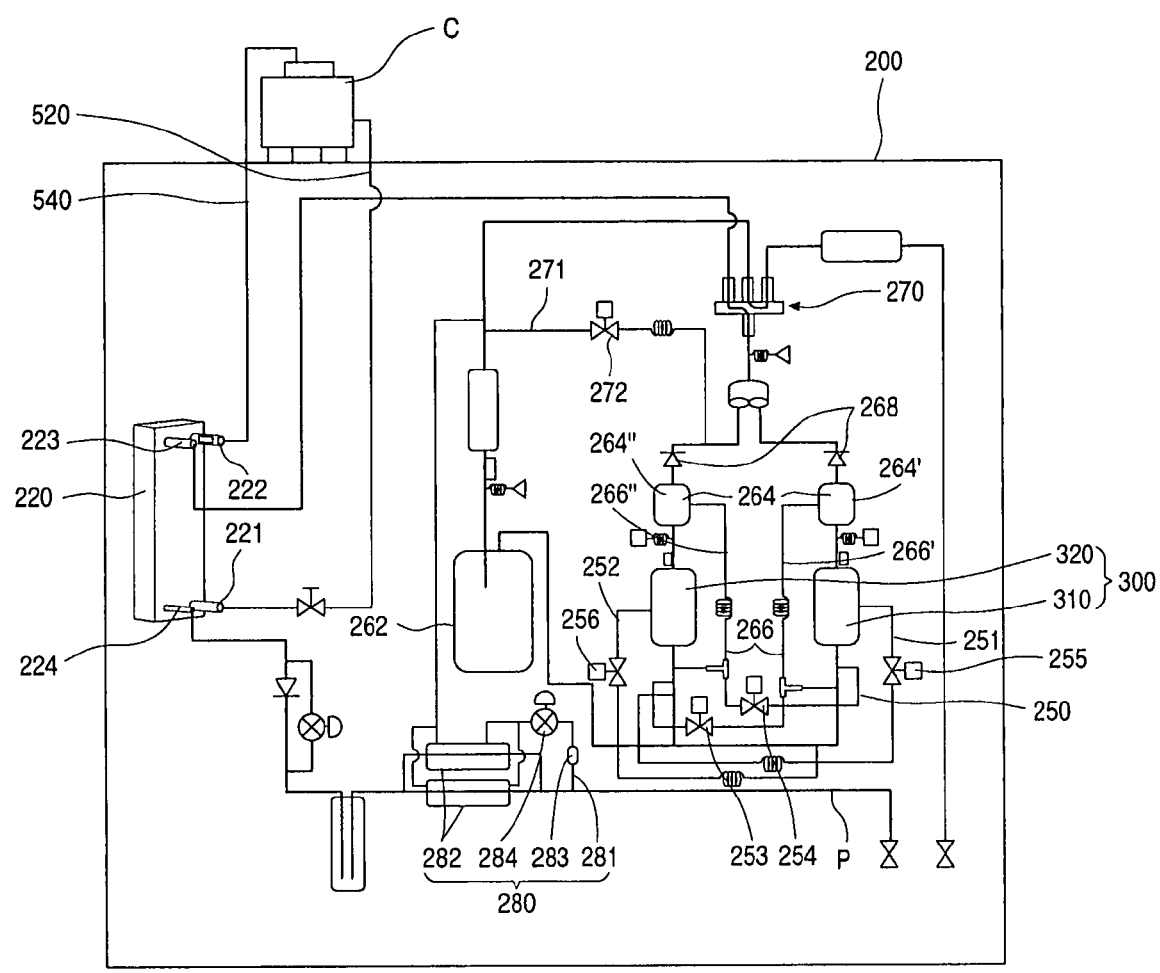
FIG. 21 is a schematic view showing the overcooler in FIG. 20 employed by the water-cooled air conditioner according to the present invention.

FIG. 20 is a perspective view of an overcooler of a water-cooled air conditioner according to another embodiment of the present invention, and FIG. 21 is a schematic view showing the overcooler in FIG. 20 employed by the water-cooled air conditioner according to the present invention.

The overcooler 280 overcools refrigerant flowing through the refrigerant discharge port 224 of the second heat exchanger 220 and the refrigerant pipes (P) connected to the first heat exchanger (not shown).

An overcooling device 282 provided on the overcooler 280 is provided in parallel and in plurality, as shown in FIG. 20. Of course, the plurality of overcooling devices 282 may be formed serially instead of parallelly.

The overcooler 280 includes a reverse transfer pipe 281 that branches from the refrigerant pipes (P) and guides the flow of refrigerant, a pair of overcooling devices 282, an expander 283 provided on the reverse transfer pipe 281 and expands refrigerant, and an overcooling valve 284 that selectively opens and closes the reverse transfer pipe 281.

The overcooling devices 282 are formed as double pipes. Accordingly, the inner portion communicates with the refrigerant pipes (P), and refrigerant guided by the reverse transfer pipe 281 flows through the outer portion. That is, the overcooling devices 282 is formed of an inner pipe and an outer pipe, whereby the refrigerant flowing respectively through the inner and outer pipes exchange heat with one another.

Because the temperature of refrigerant guided by the reverse transfer pipe 281 is lower than that of refrigerant flowing through the inner pipe, the refrigerant that is guided through the refrigerant pipes (P) passes through the inside of the overcooling devices 282 and exchanges heat to be overcooled. That is, the refrigerant guided by the reverse transfer pipe 281 passes through the expander 283 and is cooled. This low temperature refrigerant cools the refrigerant that flows through the refrigerant pipes (P).

Figure 22:
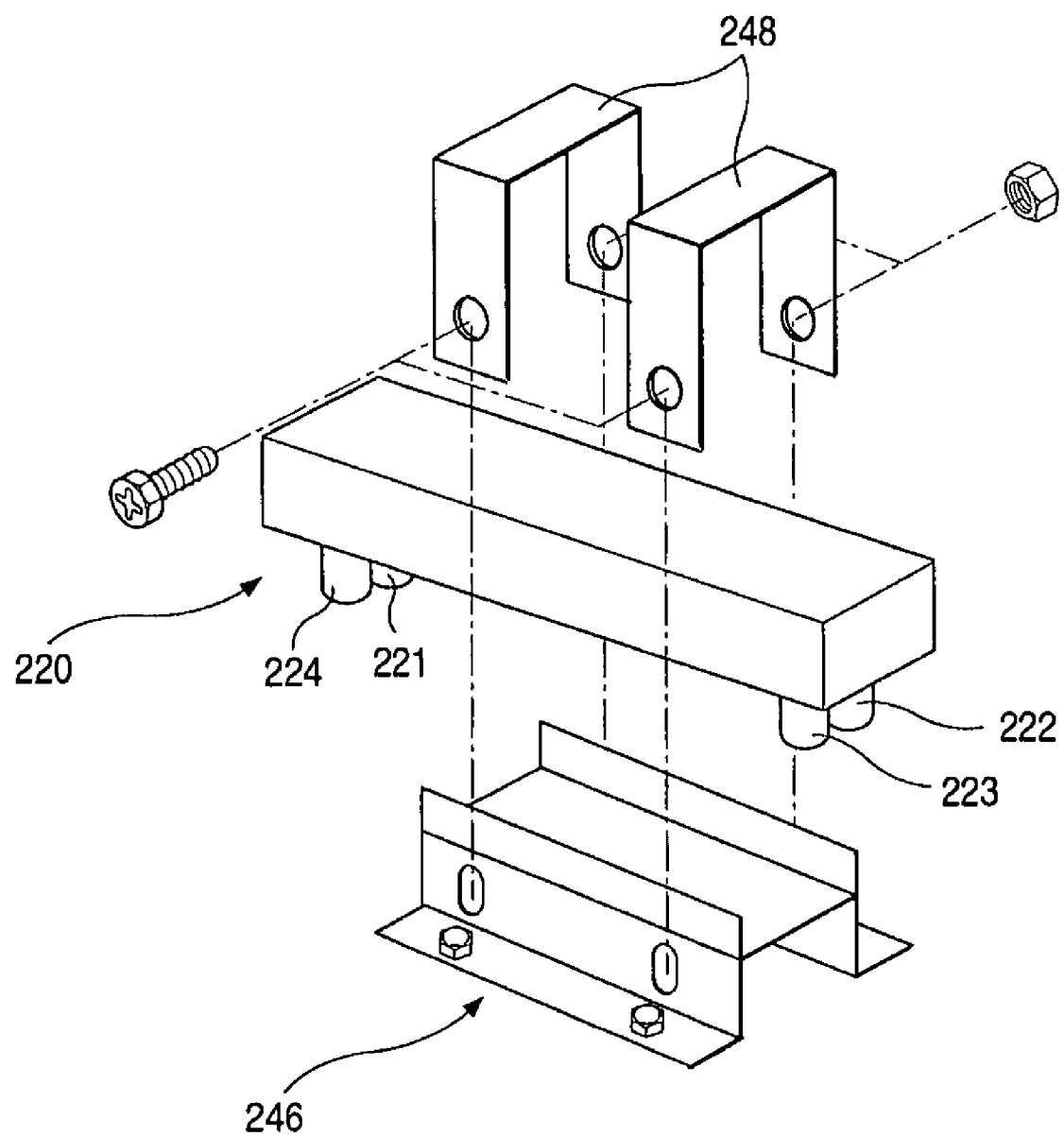
FIG. 22 is a perspective view showing the second heat exchanger of a water-cooled air conditioner according to the present invention installed in a horizontal direction.

FIG. 22 shows the second heat exchanger 220 installed horizontally instead of upright. That is, a hexahedral second heat exchanger 220 is shown installed elongated horizontally in FIG. 22.

Here, a lower support bracket 246 for supporting the second heat exchanger 220 is installed on upper surface of the base 206 (FIG. 3) that forms the outer bottom end of the second heat exchanger 220. Specifically, the lower support bracket 246 is bolted to the top surface of the base 206, in order to support the second heat exchanger 220.

Also, the top of the second heat exchanger 220 has an upper fixing bracket 248 installed thereon. The upper fixing bracket 248 may be provided as a pair formed to enclose the top and front and rear surfaces of the second heat exchanger 220.

The upper fixing bracket 248, as shown in FIG. 22, is fastened to the lower support bracket 246 by means of a bolt and nut. Thus, when the upper fixing bracket 248 is fastened to the lower support bracket 246 through a bolt and nut, the second heat exchanger 220 is firmly secured.

When the second heat exchanger 220 is horizontally installed as described above, the height of the second heat exchanger 220 that is installed inside the outdoor unit 200 may be reduced, allowing the height of the outdoor unit 200 to be reduced. Therefore, this reduction helps make the air conditioner more compact.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A water-cooled air conditioner comprising:
   an indoor unit including a first heat exchanger that performs heat exchange between air and refrigerant, the indoor unit for cooling or heating a space to be air conditioned;
   an outdoor unit separate from the indoor unit and including a second heat exchanger that performs heat exchange between water and the refrigerant;
   one or more compressors for compressing the refrigerant;
   a discharger at the second heat exchanger to discharge water that collects within the second heat exchanger to outside of the second heat exchanger; and
   a controller that operates the discharger such that power is applied to the discharger to discharge the water within the second heat exchanger to the outside.

2. The water-cooled air conditioner according to claim 1, further comprising:
   an oil restoring pipe formed between and communicating between a constant speed compressor and an inverter compressor, the oil restoring pipe for allowing oil to flow between the constant speed compressor and the inverter compressor;
   a plurality of oil separators respectively provided at discharging ends of the constant speed compressor and the inverter compressor, the oil separators for separating oil included in refrigerant discharged from the compressors; and
   an oil recoverer for guiding a flow of oil separated by one of the plurality of the oil separators to flow into one of the constant speed compressor and the inverter compressor.

3. The water-cooled air conditioner according to claim 1, further comprising an anti-freezing device at a side of the outdoor unit for preventing freezing of water within the second heat exchanger, wherein the anti-freezing device includes:
   a refrigerant bypass device for selectively allowing the refrigerant discharged from the compressors to be returned to the second heat exchanger; and
   a heater for directly heating the second heat exchanger.

4. The water-cooled air conditioner according to claim 1, wherein the controller operates the discharger when the operation of the air conditioner is stopped and the outside temperature falls below a reference temperature.

5. The water-cooled air conditioner according to claim 1, further comprising a water temperature sensor that senses a temperature of the water of the second heat exchanger, wherein the controller operates the discharger based on the temperature sensed by the water temperature sensor.

6. The water-cooled air conditioner according to claim 5, wherein the water temperature sensor senses a temperature of water that has exchanged heat with refrigerant within the second heat exchanger.

7. The water-cooled air conditioner according to claim 1, wherein the discharger includes:
   a drain portion formed to communicate with the inside of the second heat exchanger and being a passage through which the water is drained out from the second heat exchanger; and a drain valve on the drain portion for selectively opening and closing the drain portion, wherein the controller operates the drain valve such that power is applied to the drain valve to open the drain valve.

8. The water-cooled air conditioner according to claim 7, wherein the discharger further includes a drain pump for forcefully discharging water from the second heat exchanger through the drain portion, wherein the controller operates the drain pump such that power is applied to the drain pump to forcefully discharge water from the second heat exchanger through the drain portion.

9. The water-cooled air conditioner according to claim 8, wherein the second heat exchanger includes a water supply portion for supplying water into the second heat exchanger and a water return portion for returning water that has exchanged heat with the refrigerant.

10. The water-cooled air conditioner according to claim 9, wherein the pump is installed to one side of the water supply portion and pumps water into the second heat exchanger through the water supply portion.

11. The water-cooled air conditioner according to claim 10, wherein the second heat exchanger includes a refrigerant intake port formed adjacent the water return passage and a refrigerant discharge port formed adjacent the water supply passage.

12. A water-cooled air conditioner comprising:
    an indoor unit including a first heat exchanger configured to perform heat exchange between air and refrigerant, the indoor unit for cooling or heating a space to be air conditioned;
    an outdoor unit separate from the indoor unit and including a second heat exchanger configured to perform heat exchange between water and refrigerant, wherein the second heat exchanger includes a water supply portion for supplying water into the second heat exchanger and a water return portion for returning water that has exchanged heat with the refrigerant;
    one or more compressors configured to compress refrigerant;
    a water temperature sensor that senses a temperature of the water;
    a discharger to discharge water from within the second heat exchanger to outside of the second heat exchanger through a drain portion formed to communicate with the inside of the second heat exchanger; and
    a controller that operates the discharger based on the temperature sensed by the water temperature sensor.

* * * * *